US009181931B2

(12) United States Patent
McBay

(10) Patent No.: US 9,181,931 B2
(45) Date of Patent: Nov. 10, 2015

(54) GEOTHERMAL ENERGY COLLECTION SYSTEM

(71) Applicant: David Alan McBay, Palo Alto, CA (US)

(72) Inventor: David Alan McBay, Palo Alto, CA (US)

(73) Assignee: David Alan McBay, Palo Alto, CA (US)

( * ) Notice: Subject to any disclaimer, the term of this patent is extended or adjusted under 35 U.S.C. 154(b) by 0 days.

(21) Appl. No.: 13/815,266

(22) Filed: Feb. 14, 2013

(65) Prior Publication Data

US 2013/0232973 A1      Sep. 12, 2013

Related U.S. Application Data

(60) Provisional application No. 61/633,756, filed on Feb. 17, 2012.

(51) Int. Cl.
| | |
|---|---|
| *F03G 7/00* | (2006.01) |
| *F01K 27/00* | (2006.01) |
| *F03G 6/00* | (2006.01) |
| *F24J 3/08* | (2006.01) |

(Continued)

(52) U.S. Cl.
CPC ... *F03G 7/04* (2013.01); *F24J 3/08* (2013.01); *F28D 15/00* (2013.01); *F28D 20/0034* (2013.01); *F28D 2020/0047* (2013.01); *Y02E 10/10* (2013.01); *Y02E 60/142* (2013.01); *Y02E 70/30* (2013.01)

(58) Field of Classification Search
CPC ........... F01K 25/08; F01K 25/10; F03G 7/04; F24F 5/0046; F24J 3/08; F24J 3/081; F24J 3/085; F25B 30/06; F28D 1/02; F28D 15/00; F28D 20/0034; F28D 20/0052; F28D 2020/0047; Y02E 10/10; Y02E 10/12; Y02E 10/14; Y02E 10/34; Y02E 10/46; Y02E 10/125; Y02E 60/142; Y02E 70/30
USPC ................... 60/641.1, 641.2; 165/45; 62/260; 166/57–61
See application file for complete search history.

(56) References Cited

U.S. PATENT DOCUMENTS

| | | | | |
|---|---|---|---|---|
| 5,816,314 | A | * | 10/1998 | Wiggs et al. ..................... 165/45 |
| 7,320,221 | B2 | | 1/2008 | Bronicki |

(Continued)

OTHER PUBLICATIONS

Duffield, et al.: "Geothermal Energy—Clean Power from the Earth's Heat." United States Geological Survey, (2003).

(Continued)

*Primary Examiner* — Kenneth Bomberg
*Assistant Examiner* — Daniel Wagnitz
(74) *Attorney, Agent, or Firm* — Lincoln Law School of San Jose

(57) ABSTRACT

This invention provides a method of extracting geothermal energy, generally comprising the steps of: insertion of a thermal mass into a Heat Absorption Zone, absorbing heat in thermal mass, raising the thermal mass to a Heat Transfer Zone, and transferring the heat from the thermal mass. The acquired heat can be used to generate electricity or to drive an industrial process.

The thermal mass can have internal chambers containing a liquid such as molten salt, and can also have structures facilitating heat exchange using a thermal exchange fluid, such as a gas or a glycol-based fluid.

In some embodiments, two thermal masses are used as counterweights, reducing the energy consumed in bringing the heat in the thermal masses to the surface. In other embodiments, solid or molten salt can be directly supplied to a well shaft to acquire geothermal heat and returned to the surface in a closed loop system.

28 Claims, 20 Drawing Sheets

(51) Int. Cl.
*F03G 7/04* (2006.01)
*F28D 15/00* (2006.01)
*F28D 20/00* (2006.01)

(56) References Cited

U.S. PATENT DOCUMENTS

| | | | |
|---|---|---|---|
| 7,621,129 | B2 | 11/2009 | Dubois |
| 7,832,220 | B1* | 11/2010 | Wiggs .............................. 62/77 |
| 7,900,450 | B2 | 3/2011 | Gurin |
| 7,971,437 | B2* | 7/2011 | Flynn et al. ..................... 60/659 |
| 7,984,613 | B2 | 7/2011 | Dubois |
| 8,109,094 | B2 | 2/2012 | Petty |
| 8,235,140 | B2 | 8/2012 | Wideman et al. |
| 8,272,437 | B2 | 9/2012 | Bour et al. |
| 8,316,955 | B2 | 11/2012 | Saar et al. |
| 8,327,932 | B2 | 12/2012 | Karanikas et al. |
| 8,464,535 | B2 | 6/2013 | Brehm et al. |
| 8,534,069 | B2 | 9/2013 | Parrella |
| 8,616,000 | B2 | 12/2013 | Parrella |
| 8,640,772 | B2 | 2/2014 | Bour et al. |
| 8,677,752 | B2 | 3/2014 | Dubois |
| 2006/0201180 | A1* | 9/2006 | Kidwell et al. ................. 62/260 |
| 2009/0260358 | A1* | 10/2009 | Rapp et al. ................... 60/641.7 |
| 2009/0272129 | A1 | 11/2009 | Petty |
| 2009/0272545 | A1 | 11/2009 | Bour |
| 2009/0320475 | A1 | 12/2009 | Parrella |
| 2010/0000736 | A1 | 1/2010 | Bour et al. |
| 2010/0032156 | A1 | 2/2010 | Petty et al. |
| 2010/0051243 | A1* | 3/2010 | Ali et al. ................. 165/104.33 |
| 2010/0139272 | A1* | 6/2010 | Howard et al. .............. 60/641.7 |
| 2010/0154417 | A1* | 6/2010 | Ferguson et al. ............ 60/641.2 |
| 2010/0269501 | A1 | 10/2010 | Parrella |
| 2010/0270001 | A1 | 10/2010 | Parrella |
| 2010/0270002 | A1 | 10/2010 | Parrella |
| 2010/0276115 | A1 | 11/2010 | Parrella |
| 2010/0306125 | A1 | 12/2010 | Petty et al. |
| 2011/0029293 | A1 | 2/2011 | Petty et al. |
| 2011/0083436 | A1 | 4/2011 | White et al. |
| 2011/0167819 | A1* | 7/2011 | Lakic .......................... 60/641.2 |
| 2011/0203575 | A1 | 8/2011 | Emery |
| 2012/0098277 | A1 | 4/2012 | Petty |
| 2012/0181034 | A1 | 7/2012 | Bour et al. |
| 2013/0056198 | A1 | 3/2013 | Bour et al. |
| 2013/0075089 | A1 | 3/2013 | Bour et al. |
| 2013/0099491 | A1 | 4/2013 | Iovenitti et al. |
| 2013/0139807 | A1 | 6/2013 | Mandelberg et al. |
| 2014/0000838 | A1 | 1/2014 | Parrella |
| 2014/0047836 | A1 | 2/2014 | Parrella |

OTHER PUBLICATIONS

Rees: et al.: "A Study of Geothermal Heat Pump and Standing Column Well Performance." American Society of Heating, Refrigerating, and Air-Conditioning Engineers Transactions, vol. 110, part 1, p. 3-13 (2004).

John W. Lund: "100 Years of Geothermal Power." Geo-Heat Center Bulletin, p. 11-19 (Sep. 2004).
Tester, et al.: "The future of Geothermal Energy." Idaho National Laboratory Report (2006).
Zhe Wang: "Modeling Study of Single-Well Enhanced Geothermal Systems (EGS)" Masters of Science Thesis, Stanford University (Jun. 2009).
Domenico Giardini: "Geothermal Quake Risks Must be Faced." Nature, vol. 462, p. 848-849 (Dec. 2009).
International Geothermal Association: "Geothermal—A Natural Choice" (Apr. 2010).
Guomundur O. Fridleifsson: "Iceland Deep Drilling Project (IDDP)—10 Years Later—Still an Opportunity for International Collaboration." Proceedings World Geothermal Congress (Apr. 2010).
GTherm: "Gtherm Single Well Engineered Geothermal System (SWEGS) Compared to Enhanced Geothermal System (EGS)" Gtherm. http://www.gtherm.net/geothermal-power-generation/gtherm-swegs-compared-to-egs/ (Last accessed Dec. 3, 2014).
Susan Petty: "Protecting the Environment—and Our Future" (2007).
Daniel J. Whittenberger: "Estimated Heats of Fusion of Fluoride Salt Mixtures" NASA Technical Memorandum (Jun. 1986).
Dow Chemical Co. "Dowtherm SR-1 Heat Transfer Fluid: Engineering Specifications for Closed-Loop HVAC Systems" (Apr. 2002).
Dynalene: "Dynalene HT (High Temperature Heat Transfer) Fluid Specification Sheet" (2011).
Duratherm: "DuraClean FG Materiai Safety Data Sheet" (Jan. 2011).
Julie Way: "Storing the Sun: Molten Salt Provides Highly Efficient Thermal Storage." World Renewable Energy Forum (Jun. 2008).
Sharma, et al: "Review on Thermal Energy Storage with Phase Change Materials and Applications." Renewable & Sustainable Energy Reviews 13 (2009) 318-345.
Anoop Mathur "Heat Transfer and Latent Heat Storage in Inorganic Molten Salts for Concentrating Solar Power Plants." Solar Energy Technologies Program Review, (May 26, 2010).
Cetiner, Mustafa: Holcomb, David; Cetiner, Sacit: "An Overview of Liquid Fluoride Salt Heat Transport Systems" Oak Ridge National Laboratory (Sep. 2010).
Foong, et al.: "Numerical Study of a High Temperature Latent Heat Storage (200-300 C) Using Eutectic Nitrate Salt of Sodium Nitrate and Potassium Nitrate." Proceedings of the COSMOL Conference (2010).
Gregory Kolb: "An Evaluation of Possible Next-Generation High-Temperature Molten-Salt Power Towers" Sandia National Laboratories (Dec. 2011).
Solar PACES Conference Schedule, SolarPACES 2011 (2011).
Matthew J. Wald: "Storehouses for Solar Energy Can Step in When the Sun Goes Down." New York Times (Jan. 2, 2012).
John P. Cise "Specific Heat and Latent Heat of Fusion." New York Times (Jan. 3, 2012).
Cheryl Fellows: "World Renewable Energy Forum" vol. 2, (May 2012).
Emilio Sola: "Molten Salt: A New Generation?" (Sep. 21, 2012).
Novelli, et al.: "A quick look at pneumatic conveying system basics." Powder, Bulk and Engineering (Mar. 1, 2010).

* cited by examiner

GEOTHERMAL ENERGY COLLECTION SYSTEM

CROSS-REFERENCE TO RELATED APPLICATIONS

This patent application claims the benefit of U.S. Provisional Patent Application No. 61/633,756, filed on Feb. 17, 2012, the contents of which are also incorporated herein by reference.

FIELD OF THE INVENTION

This invention relates to the field of geothermal energy extraction, and more specifically to the process of extracting heat from wells drilled into the Earth and using the extracted heat for an industrial process, such as the generation of electricity, or to drive a chemical or other manufacturing process.

BACKGROUND OF THE INVENTION

Mankind has used geothermal energy for millennia. It is known that human tribes of the Neolithic Age bathed in natural hot springs, and the ancient Chinese and Roman civilizations built facilities to harness geothermal pools. With the core of the Earth believed to be over 5,000° C., it has been estimated that there is enough heat stored from the original formation of the Earth and generated by ongoing radioactive decay to meet mankind's energy needs for any foreseeable future.

The usual problems encountered in attempting to utilize geothermal energy have been practical ones of access, since the surface of the Earth is much cooler than the interior. The average geothermal gradient is about 25° C. for every kilometer of depth. This means that the temperature at the bottom of a well 5 km deep can be expected to be at a temperature of 125° C. or more. Oil companies now routinely drill for oil at these depths, and the technology required to create holes of this magnitude in the Earth is well known. (The deepest oil well at this time is over 12 km deep.) Wells of this depth, however, can be very expensive, costing over $10M to drill.

However, near geological fault zones, fractures in the Earth's crust allow magma to come much closer to the surface. This gives rise to familiar geothermal landforms such as volcanoes, natural hot springs, and geysers. In the seismically active Long Valley Caldera of California, magma at a temperature more than 700° C. is believed to lie at a depth of only 6 km. Alternatively, if lower temperatures can be utilized, a well dug to a depth less than 1 km in a geothermal zone can achieve temperatures over 100° C. A well 1 km deep often can cost much less than $1M to drill.

Electricity generation from geothermal energy was first demonstrated in Italy in 1904, but it was only in the 1950s that the first commercial operations began. The initial approach, such as that used at the Geysers facilities in Sonoma and Lake Counties, California, relies on natural steam within the Earth. At the Geysers, wells about 1-2 km deep penetrate the cap rock into a stratum containing magma-heated steam at a temperature of about 170° C. and a pressure of about 700 kPa (about 7 atm). The naturally high-pressure steam pushes to the surface through the well, and is directed to drive turbines to generate electricity. The water at the end is discarded as wastewater. (For more, see <http://www.geysers.com/>.)

A more ambitious multi-year project in Iceland, the Iceland Deep Drilling Project (IDDP) along the mid-Atlantic ridge plans to drill wells 5 km deep to tap into a source of 500° C. hot supercritical hydrous fluid at about 220 atm in pressure. (For more, see <http://iddp.is/about/>.)

Both of these projects tap into naturally existing geothermal pools of steam or superheated fluid. Such a system, often called a geothermal well, has its advantages in that the steam is naturally under pressure, and is replenished from a reservoir of groundwater. However, this technique can only be used in locations where there is magma nearer the surface to provide heat, where there is a steady supply of ground water to become pressurized steam, and a solid cap rock to keep the steam confined and under pressure. These conditions restrict the applicability of this method to relatively few geographic sites.

More recent methods to utilize geothermal energy in hot, dry rock are called enhanced geothermal systems, or EGS. [See "The Future of Geothermal Energy: Impact of Enhanced Geothermal Systems (EGS) on the United States in the $21^{st}$ Century", MIT Report, 2006, available at <http://www1.eere.energy.gov/geothermal/egs_technology.html>.] In such a system all that is needed is for a pool of geothermal heat to exist at a depth where wells can be economically produced. In an EGS setup, a first well is drilled several kilometers deep and large volumes of water injected down into the hot rock. The water can be injected at temperatures that fracture the lower hot rock to make it more permeable. This process is called hydraulic fracturing, or "fracking". The water being pumped into the injection well is then heated below the surface to become steam, and pumped out in a second well. This method for generating electricity is therefore similar to the previously described traditional geothermal technique, except in EGS the water is supplied by the system. The spent water, once the heat has been extracted to generate electricity, is re-injected into the injection well.

FIG. 1 illustrates a prior art EGS system. At or near the surface of the Earth 10, an EGS facility 12 provides a pumping system that injects water into the Earth and pumps water/steam from the Earth once heated. An injection well 14 extends into the Earth to a depth significantly hotter than the surface 10. The region of the Earth at this hotter temperature is designated a thermal pool 560. Water is then injected from the EGS facility 12 into the injection well 14, where it disperses into the thermal pool 560. Sometimes, the water is injected at such pressures that it causes a network of fractures 570 in the hot rock of the thermal pool 560, making it more permeable to water, and increasing the surface area of the rock in order to heat the water more quickly. Once the water is heated in the thermal pool 560, it is pumped out the production well 16, either as superheated water or as supercritical steam. The heated water/steam is used to drive a production facility 20 to generate electricity.

EGS can be used anywhere there is a suitable stratum of hot rock at accessible depths, as long as there is a supply of water to initiate the process and to replenish what is lost. Because the water/steam brought to the surface is intended to be recaptured once the heat is extracted and re-injected into the injection well, this is called a closed loop system. It is proving a popular alternative for geothermal energy, notably because it can be used in far more geographic sites than traditional geothermal wells.

EGS geothermal energy production facilities are being developed by several companies, including AltaRock Energy, Inc. of Seattle, Wash. AltaRock Energy Inc. has several issued patents on their technology, such as U.S. Pat. No. 8,109,094 (SYSTEM AND METHOD FOR AQUIFER GEO-COOLING by S. Petty, filed Apr. 30, 2009 and issued Feb. 7, 2012); and U.S. Pat. No. 8,272,437 (ENHANCED GEOTHERMAL SYSTEMS AND RESERVOIR OPTIMIZATION by D. Bour and S. Petty, filed Jul. 7, 2009 and issued Sep. 25, 2012); and has several applications pending, such as U.S. patent application Ser. No. 12/432,306 (SYSTEM AND METHOD FOR USE OF PRESSURE ACTUATED COLLAPSING CAPSULES SUSPENDED IN A THERMALLY EXPANDING FLUID IN A SUBTERRANEAN CONTAINMENT SPACE by D. Bour, filed Apr. 29, 2009);
Ser. No. 12/433,747 (METHOD AND COOLING SYSTEM FOR ELECTRIC SUBMERSIBLE PUMPS/MOTORS FOR USE IN GEOTHERMAL WELLS by S. Petty, filed Apr. 30, 2009);
Ser. No. 12/538,673 (METHOD FOR TESTING AN ENGINEERED GEOTHERMAL SYSTEM USING ONE STIMULATED WELL by S. Petty, P. Rose and L. Nofziger, filed Aug. 10, 2009);
Ser. No. 12/754,483 (METHOD FOR MODELING FRACTURE NETWORK, AND FRACTURE NETWORK GROWTH DURING STIMULATION 1N SUBSURFACE FORMATIONS, by S. Petty, M. Clyne and T. Cladouhos, filed Apr. 5, 2010);
Ser. No. 12/791,735 (SYSTEM AND METHOD FOR DETERMINING THE MOST FAVORABLE LOCATIONS FOR ENHANCED GEOTHERMAL SYSTEM APPLICATIONS, by S. Petty, O. Callahan, M. Clyne and T. Cladouhos, filed Jun. 1, 2010);
Ser. No. 13/326,285 (HIGH TEMPERATURE TEMPORARY DIVERTER AND LOST CIRCULATION MATERIAL by D. Bour, L. Watters, S. Petty and A. Apblett, filed Dec. 14, 2011); and
Ser. No. 13/342,924 (SYSTEM AND METHOD FOR AQUIFER GEO-COOLING by S. Petty, filed Jan. 3, 2012);
which may be considered prior art for the invention disclosed in this application.

However, there are some drawbacks to such prior art systems using EGS. First, energy must be expended both to force water down into the injection well, and to pump the heated water/steam from within the Earth. Although the energy produced can still be significantly larger, it is an additional, ongoing cost. Second, EGS requires very large quantities of water to serve the needs of the injection well. In the western United States, the most likely area to deploy EGS because geothermal resources can be tapped with shallower wells, water is scarce and coveted resource. In those areas where sufficient water is available, additional problems arise due to the ultimate pollution of that water due to the minerals, salts and other toxic elements injection well water concentrates as it moves through the EGS cycle. Third, "fracking" in the Earth at the bottom of the injection well can release methane, contaminating groundwater, and creates seismic events, which can sometimes be felt at the surface as earthquakes. A recent EGS project in Switzerland was suspended and ultimately cancelled due to strong seismic events (including a magnitude 3.4 earthquake) in the nearby city of Basel triggered by the injection well [see, for example, Domenico Giardini, "Geothermal quake risks must be faced", Nature Vol. 463, p. 293 (January 2010)].

FIG. 2 illustrates a prior art alternative approach to mining heat from dry hot rock as proposed by GTherm Inc. of Westport, Conn. In the prior art GTherm system, as in EGS, a surface facility 12-1 at the surface of the Earth 10 provides a pumping system 18-1 to inject water into the Earth through injection piping 14-1, and to pump water/steam from the Earth through production piping 16-1 once heated. However, in the GTherm system, a single well shaft 11-1 with a well head 15-1 extends into the Earth to the thermal pool 560, and contains both the injection piping 14-1 and the production piping 16-1. At the base of the well shaft, using underground drilling techniques such as potter drilling, developed by Potter Drilling Inc. of Redwood City, Calif. and described in part in U.S. Pat. No. 8,235,140 (METHOD AND APPARATUS FOR THERMAL DRILLING by T. Wideman, J. Potter, D. Dreesen and R. Potter, filed Oct. 8, 2009 and issued Aug. 7, 2012), a chamber 580 in the rock is formed surrounded by the thermal pool 560, and them sealed with a coating 590 of a special proprietary grout. This chamber 580 with coating 590 forms what GTherm designates a "Heat Nest".

Water is then injected through the injection piping 14-1 into the chamber 580 with coating 590, creating a reservoir of liquid 550. This liquid 550 heats up, and is then pumped out of the same well shaft 11-1 through the production piping 16-1, either as superheated water or as steam. As in the previous EGS configuration, the heated water/steam is used to drive a production facility 20-1 to generate electricity.

This modified, single well EGS (SWEGS) closed loop approach of GTherm has some advantages over conventional EGS. First, once the heat nest has been formed, no fracturing of the bedrock need occur, meaning no seismic events will occur to disturb surface residents. Second, the water remains confined in the heat nest, and does not mix with local water sources or become contaminated with minerals or organic compounds from the local soil. Third, since the water used in the thermal loop does not mix with the local sources of groundwater, groundwater contamination does not occur unless there is damage or a leak to piping in the well shaft.

Several patent applications have been filed on this SWEGS technology, including U.S. patent application Ser. No. 12/456,434 (SYSTEM AND METHOD OF CAPTURING GEOTHERMAL HEAT FROM WITHIN A DRILLED WELL TO GENERATE ELECTRICITY by M. Parrella, and filed Jun. 15, 2009; and Ser. No. 12/462,656 (CONTROL SYSTEM TO MANAGE AND OPTIMIZE A GEOTHERMAL ELECTRIC GENERATION SYSTEM FROM ONE OR MORE WELLS THAT INDIVIDUALLY PRODUCE HEAT);

Ser. No. 12/462,657 (SYSTEM AND METHOD OF MAXIMIZING HEAT TRANSFER AT THE BOTTOM OF A WELL USING HEAT CONDUCTIVE COMPONENTS AND A PREDICTIVE MODEL);

Ser. No. 12/462,658 (SYSTEM AND METHOD OF MAXIMIZING GROUT HEAT CONDUCTIBILITY AND INCREASING CAUSTIC RESISTANCE); and Ser. No. 12/462,661 (SYSTEM AND METHOD OF MAXIMIZING PERFORMANCE OF A SOLID-STATE CLOSED LOOP WELL HEAT EXCHANGER), all by M. Parrella and filed Aug. 5, 2009.

Although the SWEGS variation does offer improvements over conventional EGS, it still uses water as the fluid to carry heat from the thermal pool to the surface. As illustrated in Table I, if the temperature in the thermal pool is below 100° C., liquid water has a large energy density, and can do an efficient job of bringing heat to the surface. Water has a specific heat of 4.187 kJ/(kg °C.) and a density of 1,000 kg/m$^3$, giving an appreciable energy density of 4,187 kJ/(m$^3$ °C.). However, at a pressure of 1 atmosphere (1 atm, also 1.01 bar or 101 kPa) the temperature of liquid water is at most 100° C., and therefore the amount of heat that can be raised with each kilogram of water is limited by its boiling point.

TABLE I

Table I: Specific Heat, typical Mass Density, and Energy Density of water, steam, and various other substances.

| | Specific Heat kJ/(kg ° C.) | Mass Density kg/m³ | Energy Density kJ/(m³ ° C.) |
|---|---|---|---|
| Water (20° C.) | 4.187 | 1,000 | 4,187 |
| Superheated Water (161 atm, 350° C.) | 8.138 | 579 | 4,712 |
| Steam (1 atm, 100° C.) | 2.027 | 0.59 | 1.2 |
| Superheated Steam (10 atm 350° C.) | 1.623 | 3.95 | 6.4 |
| Uranium | 0.120 | 19,100 | 1,292 |
| Granite | 0.790 | 2,700 | 2,133 |
| Molten Salt (142-540° C.) | 1.560 | 1,680 | 2,621 |
| Aluminum (#6061) | 1.256 | 2,710 | 3,404 |
| Cast Iron | 0.456 | 7,920 | 3,612 |
| Stainless Steel (Grade 316) | 0.502 | 8,027 | 4,030 |

Sources:
Water: http://www.engineeringtoolbox.com/water-thermal-properties-d_162.html
Supercritical Water: www.isa.org/~birmi/magnetrol/Technical_Handbook.pdf
Steam: http://www.thermexcel.com/english/tables/vap_eau.htm
Superheated Steam: http://www.spiraxsarco.com/esc/SH_Properties.aspx
Salt/Metals: http://www.engineeringtoolbox.com/sensible-heat-storage-d_1217.html
Steel: http://www.engineersedge.com/properties_of_metals.htm Water can be superheated under pressure, and can have a boiling point as high as 374° C. under a pressure of 214 atm. Table I also shows the energy density achievable for water superheated to 350° C. If the production well is suitably airtight and pressurized, higher temperatures can be maintained, and with the greater temperature increase, significantly more heat can be pumped to the surface when superheated water is used. However, such high-pressure plumbing systems for a well several kilometers below the surface can be difficult to maintain. Also, superheated water can be a much better solvent for larger organic compounds, particularly if they have some polar groups or contain aromatic compounds, increasing the risk of contamination in the system. Therefore, superheated water can be more corrosive than water at ordinary temperatures, and at temperatures above 300° C. special corrosion resistant alloys may be required for the well casing, depending on the composition of the dissolved components.

An alternative to using superheated water is to allow the water underground to boil and become steam. Extreme pressures need not be maintained to control the flow of the steam at temperatures that can be significantly hotter than 100° C. But, as shown in Table I, the energy density of steam is significantly lower than liquid water. Even though the specific heat (2.027 kJ/(kg ° C.)) is smaller by only a factor of 2, the much lower density (typically 0.6 kg/m³) of normal steam means the same volume of steam holds 3,500 times less heat than liquid water. Supercritical heating of steam, increasing the temperature and pressure, can increase the volumetric energy density somewhat, but typically not by more than a factor of 10, and then the problems of managing an extremely hot fluid under pressure are reintroduced.

Table I also compares the energy density possible with water and steam with a few other materials, notably molten salt (heated above 142° C.) and several metals. These support an energy density much higher than that of steam for cases where the thermal pool is hotter than 100° C., especially for the case of stainless steel, where the energy density approaches water again.

There is therefore a need for a geothermal system which can operate as a closed loop system without causing seismic damage or groundwater contamination, but which also allows for a substance with a large volumetric energy density to be used to absorb heat inside the Earth from depths where the temperature is greater than 100° C., coupled with an efficient means to bring the heated substance to the surface of the Earth for thermal harvesting.

BRIEF SUMMARY OF THE INVENTION

The invention disclosed with this application is a method of extracting energy from the Earth. There are many embodiments of the invention disclosed here. Several embodiments of the invention comprise the insertion of a thermal mass into a Heat Absorption Zone, having the thermal mass absorb heat while in the Heat Absorption Zone, raising the thermal mass to a Heat Transfer Zone, and transferring the heat from the thermal mass.

In some embodiments of the invention, the thermal mass comprises internal chambers filled with a liquid thermal absorber such as molten salt, and the transfer of heat comprises transferring the heated liquid thermal absorber out of the thermal mass.

In some embodiments of the invention, the thermal mass comprises structures to facilitate heat exchange with a thermal exchange fluid, and the transfer of heat comprises flowing an exchange fluid through the thermal mass.

In some embodiments of the invention, the thermal mass is balanced with a counterweight. In some embodiments of the invention, the counterweight is another thermal mass.

In some embodiments of the invention, the heat transferred from the thermal mass can be utilized for a number of possible industrial processes, including generating electricity.

In some embodiments of the invention, a solid material, such as a salt mixture, is transported into a Heat Absorption Zone, where it absorbs heat and melts. The hotter melted material is then raised to a Heat Transfer Zone, and the heat is transferred from the material and used to drive a number of possible industrial processes, including generating electricity.

Note that the illustrations provided are for the purpose of illustrating how to make and use the invention, and are not to scale. The wells are anticipated to be kilometers deep, while the thermal masses are expected to be typically 50 centimeters to 30 meters long and from 10 to 100 centimeters in diameter, and can be scaled to be other sizes and shapes if desired.

DETAILED DESCRIPTIONS OF EMBODIMENTS OF THE INVENTION

What follows are detailed descriptions of several embodiments of the invention, including embodiments believed by the inventor to be the best mode.

Figure 1:
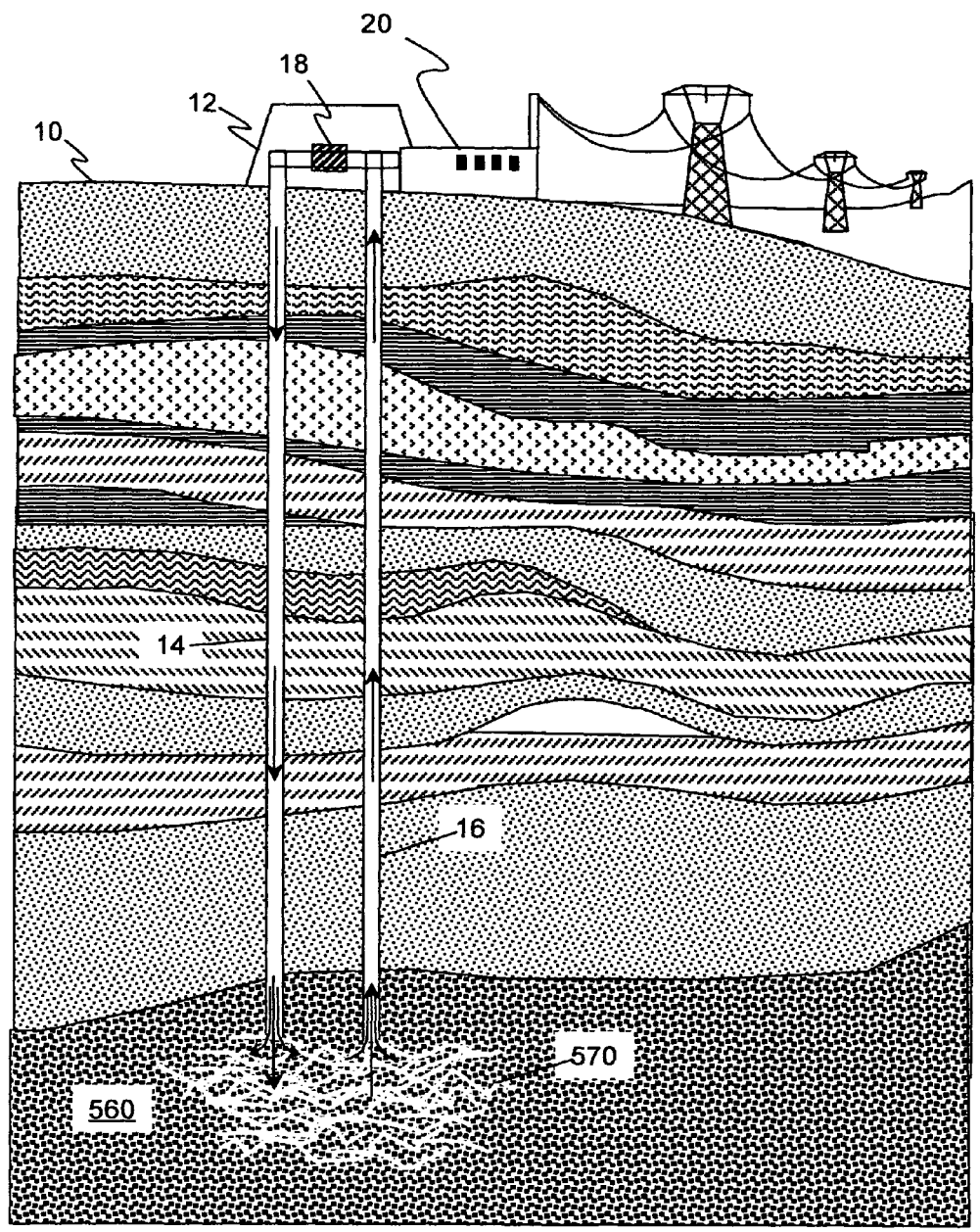
FIG. 1 presents a schematic overview of an example of prior art enhanced geothermal systems (EGS) for geothermal energy extraction.
Figure 2:
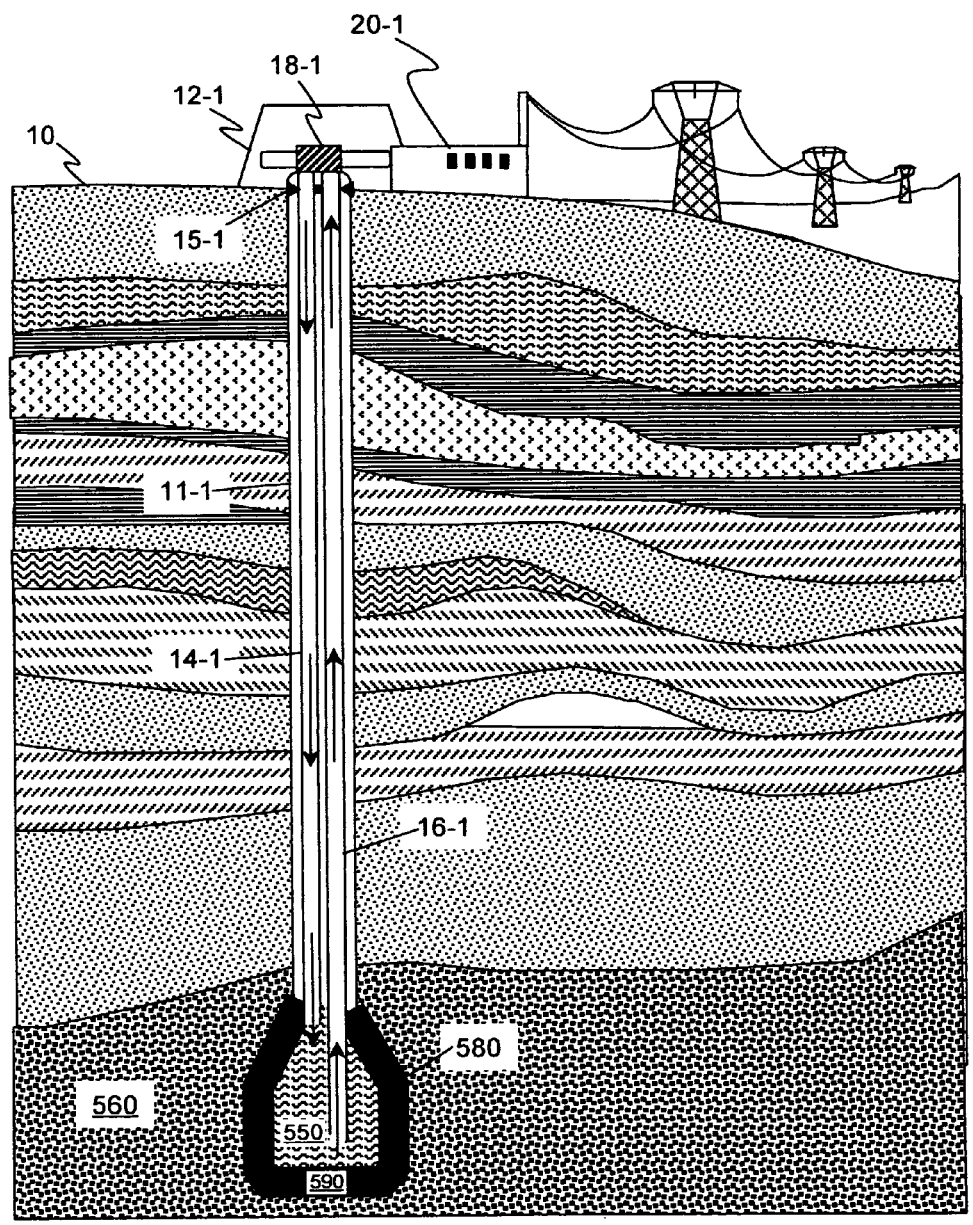
FIG. 2 presents a schematic overview of a prior art single-well enhanced geothermal system (SWEGS) using a thermal nest for geothermal energy extraction.
Figure 3:
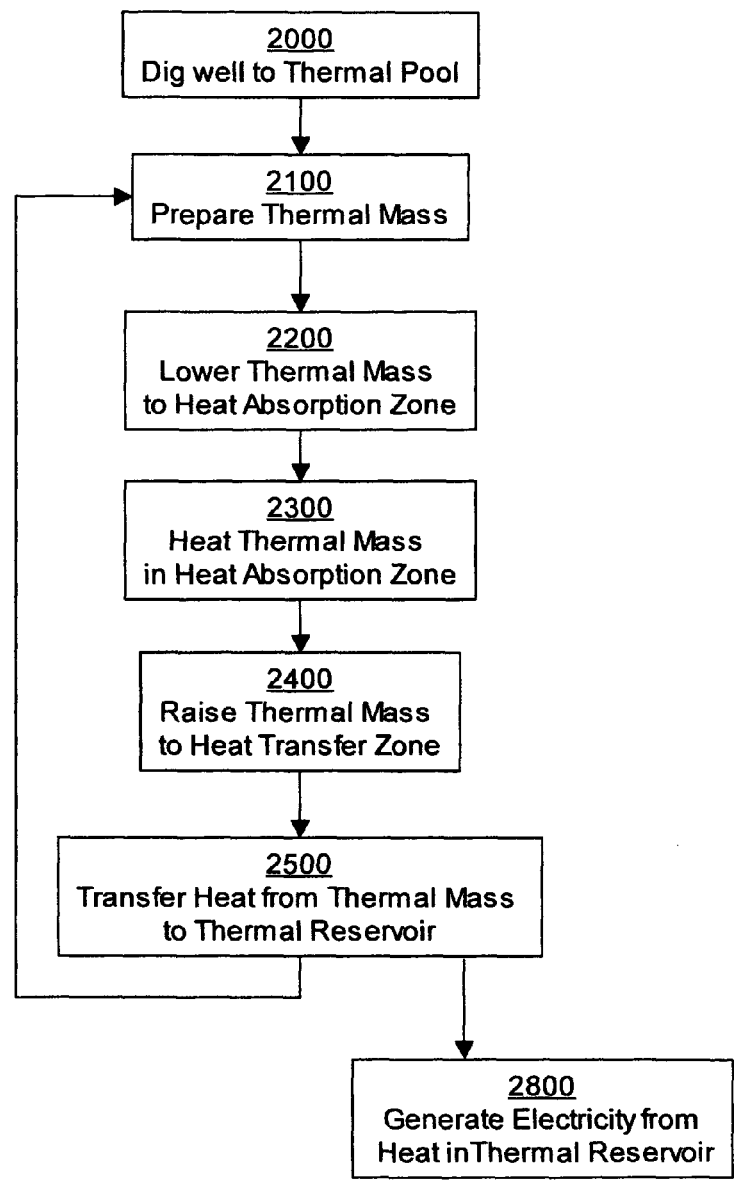
FIG. 3 presents a flow diagram of the thermal extraction process according to several embodiments of the invention.
Figure 4:
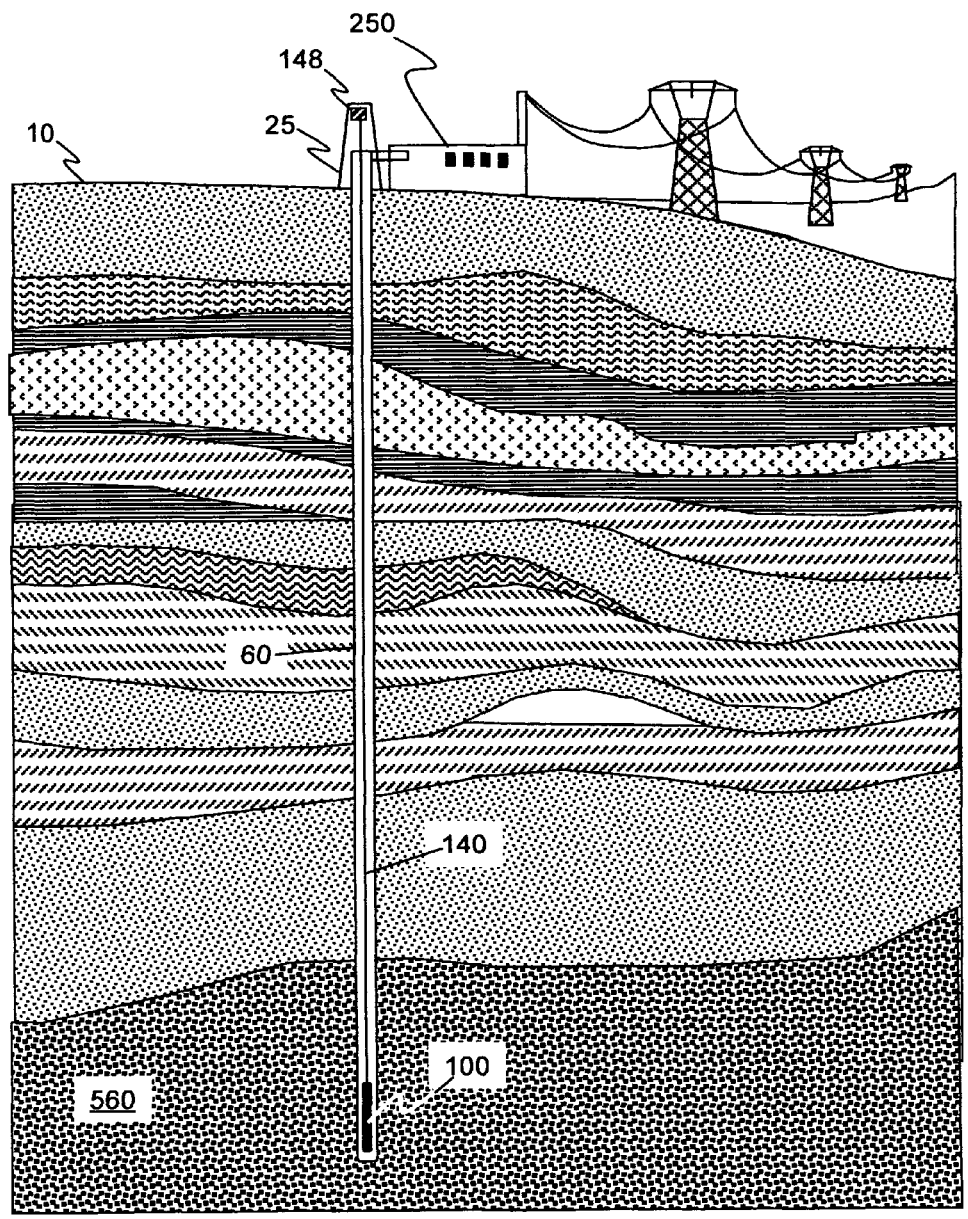
FIG. 4 presents a schematic overview of one embodiment of the invention.

Common to many embodiments of the invention are the steps illustrated in the flow diagram of FIG. 3 and the overview illustration shown in FIG. 4. To start, as shown in FIG. 3, the initial step 2000 comprises digging a well shaft 60 into the Earth, until a portion of the well shaft 60 is surrounded by a thermal pool 560. It should be noted that some embodiments of the invention could be implemented in a pre-existing well, so that a new well shaft 60 need not be dug for each installation.

In the second step 2100, a thermal mass 100 is then prepared with a procedure that typically comprises attaching it to a suspension cable 140 which in turn is attached to a control system 148 for raising and lowering the thermal mass 100. Once the thermal mass has been prepared, in the next step 2200 the thermal mass 100 is then lowered down the well shaft 60 until it reaches the thermal pool 560. This region is designated the Heat Absorption Zone. The next step 2300 comprises allowing the thermal mass 100 to remain in the Heat Absorption Zone until a desired temperature is reached or a predetermined amount of heat has been absorbed by the thermal mass 100. The illustration in FIG. 4 represents the process at this point.

After this, the next step 2400 comprises raising the heated thermal mass 100 to an area designated the Heat Transfer Zone, typically near the surface of the Earth 10. The next step 2500 comprises extracting the heat energy from the thermal mass 100 and transferring it to a thermal reservoir 200. After this, the thermal mass 100 can be prepared again according to a repetition of the second step 2100 and the subsequent steps 2200 through 2500 repeated, and the cycle continues.

At the same time, according to alternative step 2800, the heat energy transferred into the thermal reservoir 200 can be used in a production facility 250 for a number of useful processes, such as generating electricity, driving another industrial process such as pyrolysis, or simply being stored for later use. A housing 25 or other structure to protect the well shaft 60 from the elements can also be constructed, either independent of, or in connection with the production facility 250.

For the purposes of this description, the term "thermal mass" can be any discrete object, whether it be solid, hollow, liquid filled, etc. that has a mass and a heat capacity and is prepared for insertion into the thermal well. It can be a simple slug of metal, chosen for its heat capacity, or a more complex structure with internal mechanisms, piping and structures, and may additionally comprise reservoirs of fluids and plumbing to facilitate the transfer of heat by the transfer of fluids into and out of the thermal mass. It may also contain chambers or other structures to facilitate an internal chemical process.

The preparation of the thermal mass can be a procedure as simple as attaching it to a cable for suspension. However, if there are more complex internal structures, such as internal piping and reservoirs, the preparation can also comprise checking the temperatures, pressures, fill levels and purity of fluids in the chambers, the distribution of mass, making an exchange of fluids needing replacing, confirming the condition of the seals on the valves and connectors, corrosion, inspection for cracks or other damage on the external shell or the suspension cables, determining the security of any hoses and seals, the calibration of any gauges or data sensors, etc.

For the purposes of this description, the term "thermal pool" refers to a portion of the Earth underground that is significantly hotter than at the surface, and which therefore provides a source of energy. Although the thermal pool as described in the embodiments of the invention disclosed here will generally be a stratum of hot dry rock as might be used in the prior art EGS configurations, these embodiments may also be applied to any geothermal heat source, including to wells which extend deep enough to encounter molten rock or magma within the Earth.

For the purposes of this description, the term "thermal well" refers to the Heat Absorption Zone, and describes a structure created in the Earth, typically by drilling a hole, in which at least a portion of the structure, typically the bottom, is in the thermal pool, and is therefore naturally at a significantly hotter temperature than is found on the surface of the Earth. When an object, such as the thermal mass, is inserted into the thermal well and left there, the object heats up as it is surrounded by the thermal pool.

A First Embodiment of the Invention

Figure 5:
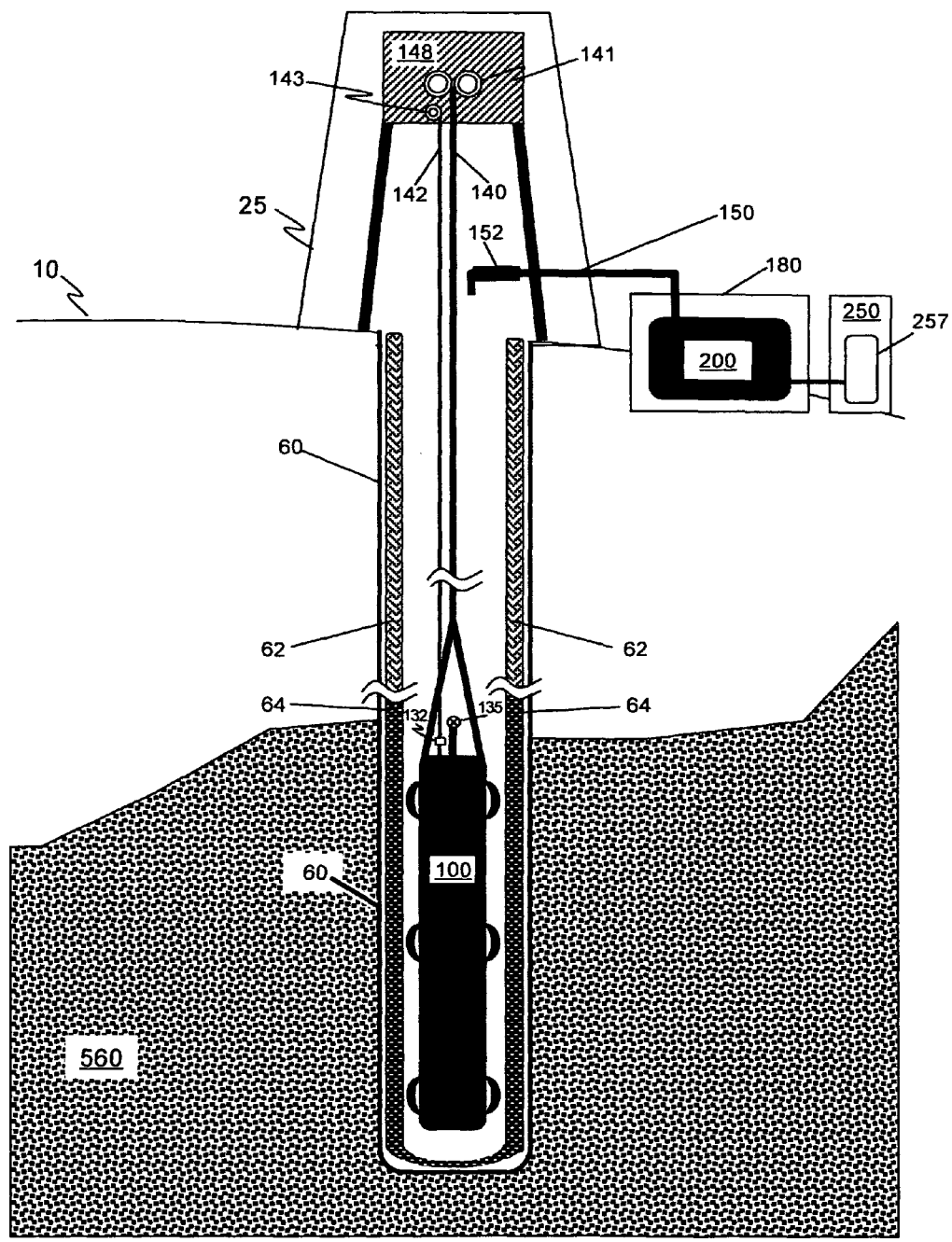
FIG. 5 presents in more detail a cross section view of an embodiment of the invention in which a thermal mass is being heated.
Figure 6:
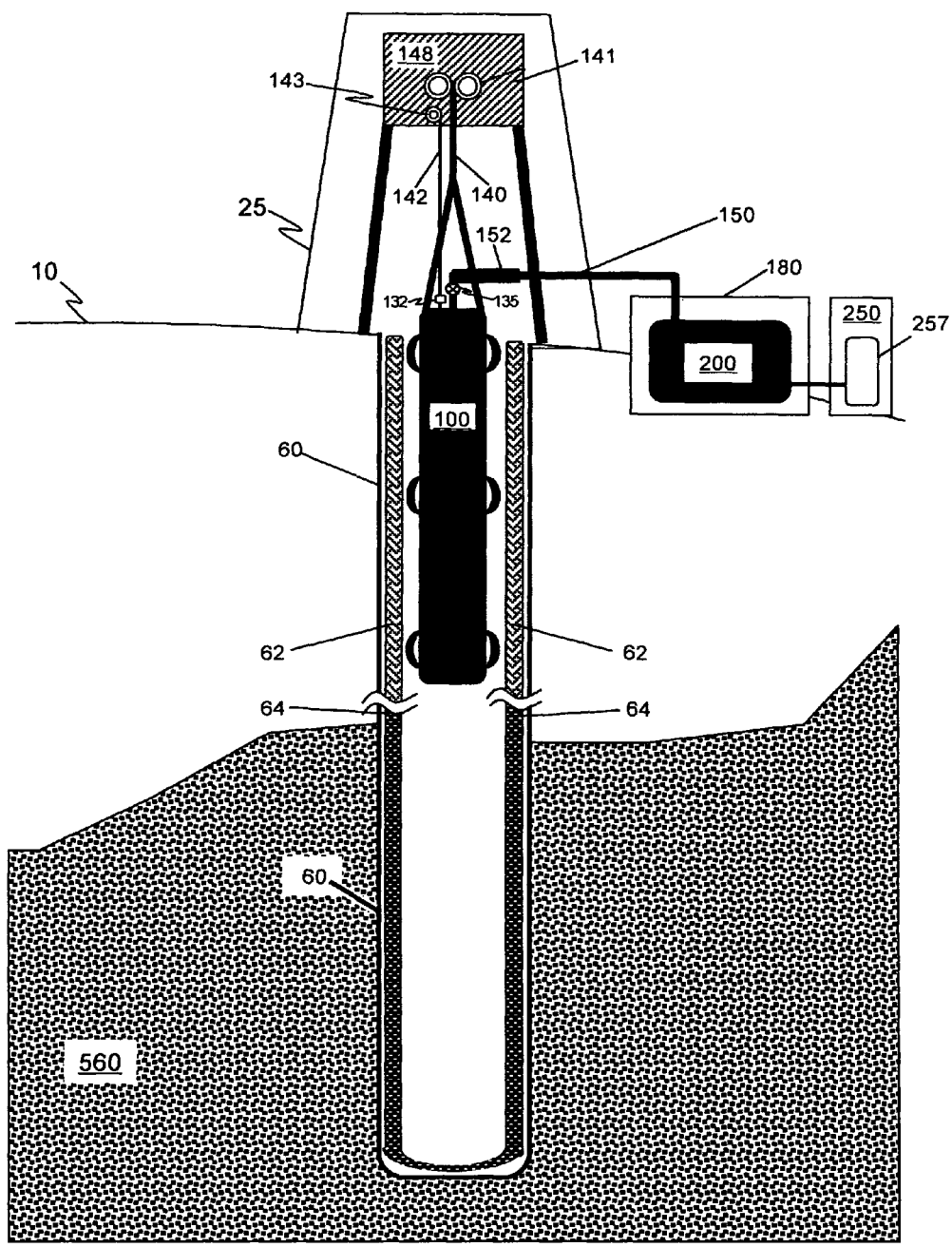
FIG. 6 presents in more detail a cross section view of the embodiment of the invention shown in FIG. 5 in which the thermal mass has been raised to the surface and heat is being transferred from thermal mass to a thermal reservoir.

One embodiment of the invention is illustrated in more detail in FIG. 5 and FIG. 6. Note that these illustrations are not to scale, since the wells are anticipated to be kilometers deep while the thermal masses are expected to be, for example, 1 to 30 meters long and perhaps 50 to 100 centimeters in diameter.

In this embodiment of the invention, the deeper part of the well shaft 60 surrounded by the thermal pool 560, can be lined with a thermal casing 64 that facilitates the transfer of heat from the thermal pool 560 to the thermal mass 100. This thermal casing can be made using a material such as a thermally conducting grout, often made from compositions comprising water, cement, siliceous gel, and sometimes bentonite. Additional materials such as iron filings or other metallic powders can be mixed into the grout to enhance thermal conductivity. The surface can also be treated to be smooth to increase emissivity for enhancing radiative heat transfer. Although the well shaft as shown is a simple vertical hole, the well shaft can have more complex structures such as varying diameters, chambers situated at various positions along the shaft, or side tunnels.

Likewise, the upper part of the well shaft 60, which is at cooler temperatures, can be lined with an insulating casing 62 that prevents heat from the thermal mass 100 from dissipating before it reaches the top of the well shaft 60. This insulating casing can be made using a material such as solid concrete, porous concrete, tubing walls of ⅜" thick stainless steel, or a layered structure of concrete and steel. For insulation in high heat situations, a weave of basalt fabrics such as those manufactured by Smarter Building Systems of Newport, R.I. may provide an adequate insulating casing. Other fiber products comprising ceramic or silica materials can also be used.

The system also comprises suspension mechanism such as a suspension cable 140 or other suspension rigging that suspends the thermal mass 100 in the well shaft 60. The suspension cable 140 can be attached to a suspension mechanism 141 for raising and lowering the suspension cable 140 and the attached thermal mass 100, which in turn is managed by a control system 148. The system can also comprise an additional communication cable 142 with a data connector 132 to sensors in the thermal mass 100 that provide data about variables of interest such as temperature, thermal expansion, distribution of mass, etc. This communication cable 142 can be managed using independent mechanism 143 that winds and unwinds the communication cable 142 as the thermal mass 100 is lowered and raised. In some embodiments, the communication cable can instead be integrated into the suspension cable 140, and raised and lowered using the suspension mechanism 141. A housing 25 can be provided to protect the machinery for raising and lowering the thermal mass 100 from the elements.

In some embodiments of the invention, a thermal transfer system in the Heat Transfer Zone will also be provided to unload the heat in the thermal mass 100. In some embodiments, heated fluid from the thermal mass 100 is transferred through a thermal transfer conduit 150, which can in some embodiments have a moving or telescoping junction 152 to connect with the thermal mass 100 using a thermal fluid connector 135. The heated fluid is then transferred to a thermal reservoir 200 contained in a thermal reservoir containment 180. The heat in the thermal reservoir 200 is then used to generate electricity or drive an industrial process in a production facility 250, which can comprise a means for generating electricity 257 or other production equipment.

In some embodiments of the invention, the heat can be transferred by detaching the thermal mass 100 from the suspension cable 140 and placing the hot thermal mass 100 into a thermal reservoir 200 for subsequent thermal transfer. If the thermal mass 100 is designed as a simple slug of metal with a large heat capacity, this transfer can comprise placing the hot thermal mass into a fluid bath in the thermal reservoir 200, in which the heat is transferred from the thermal mass to the fluid in the bath. If the thermal mass 100 is a metallic structure with more complex internal structures, such as internal tubes that facilitate fluid flow for heat transfer through the thermal mass 100, the thermal mass 100 can be attached to a plumbing system that provides fluid that removes the heat from the inside of the thermal mass 100 as it passes through the various internal tubes.

In the meantime, while the initial thermal mass 100 is transferring heat in the Heat Transfer Zone, an alternate thermal mass, which will typically be an object with dimensions and a construction similar to the initial thermal mass 100, can be attached to the suspension cable 140 and lowered into the well shaft 60 to begin heating in the Heat Absorption Zone.

Figure 7:
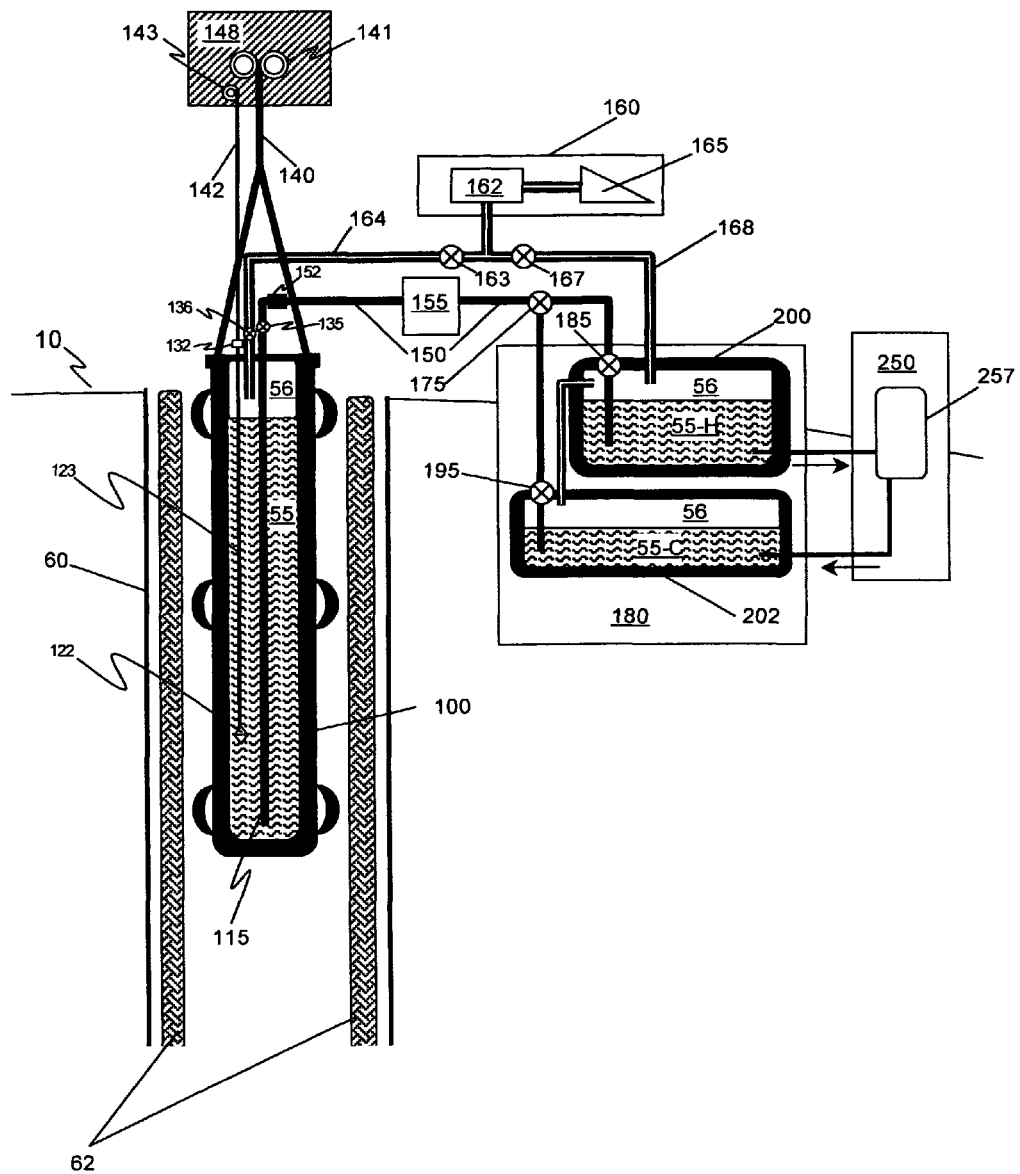
FIG. 7 presents a cross section view of an embodiment of the invention that uses a thermal fluid to transfer the heat from the thermal mass.

FIG. 7 provides a more detailed illustration of one embodiment of the invention. For this embodiment, the thermal mass 100 comprises a hollow cavity, typically cylindrical in shape, which is filled to a predetermined level with a thermal fluid 55. The fluid can be liquid water if used in a relatively cool well below 100° C.; or a molten salt or combination of salts, such as, for example, CN—K (Potassium Calcium Nitrate—$KNO_3$ $5Ca(NO_3)_2$ $10H_2O$) as offered by Yara International ASA of Norway for warmer wells, (e.g. 150° C. to 500° C.); or, for higher temperatures (e.g. 300° C. to 1000° C.) a molten salt mixture such as one comprising by weight 50% Potassium Nitrate ($KNO_3$), 40% Sodium Nitrite ($NaNO_2$) and 7% Sodium Nitrate ($NaNO_3$). Other mixtures of salts can be used, comprising salts such as sodium fluoride (NaF), sodium chloride (NaCl), potassium fluoride (KF), potassium chloride (KCl) (which melt at even higher temperatures) as long as their proportions are managed to provide an appropriate thermal and fluid properties for the temperature of the thermal pool 560. Mixtures of molten salts used for energy storage and transport in the concentrated solar power (CSP) facilities may also be adapted for use in the embodiments of the invention disclosed here.

During the preparation of the thermal mass 100, the hollow interior of the thermal mass 100 is provided with thermal fluid 55 from a cool thermal fluid reservoir 202 which will typically contain previously cooled fluid 55-C. This cool thermal fluid reservoir 202 will typically be constructed in the thermal reservoir containment 180, which also contains the thermal reservoir 200 for heated thermal fluid 55-H. The filling process for the thermal mass 100 can be controlled by a pumping system 155 through a valve on the cool thermal fluid reservoir 202 and a valve 185 that switches the pumping system 155 between the cool thermal fluid reservoir 202 and the thermal reservoir 200. The fluid 55 is provided to the thermal mass 100 through thermal transfer conduit 150 through the moving or telescoping junction 152 which connects to the thermal mass 100 at the thermal fluid connector 135. The thermal mass 100 in some embodiments will comprise an interior transfer tube 115 connected to the thermal fluid connector 135 that extends to near the bottom of the reservoir within thermal mass.

Since hot fluids, and in particular a molten salt system, can degrade rapidly when exposed to air, and additionally can be corrosive and dangerous, it may be advisable to seal the thermal fluid from exposure to the ambient environment. In that case, there can be an additional system to provide a cover gas 56 compatible with the thermal fluid 55 to allow fluid levels to vary without venting the system to outside air. Such a cover gas system would include a cover gas manager 160, comprising a cover gas reservoir 165 and a cover gas pumping system 162 to provide cover gas 56 to the thermal mass 100 through a valve 163 and piping 164, which connects to the thermal mass 100 at a cover gas connector 136, or to provide cover gas 56 to the thermal reservoir containment 180 through a valve 167 and piping 168.

The thermal mass 100 may also comprise sensors such as a temperature sensor 122 connected to an internal data cable 123 that connects at a data connector 132 to the communication cable 142. The selection of the exact materials used in the temperature sensor 122 may be different, depending on the selection of thermal fluid 55 and the temperature increases expected. In particular, any sensors that are used must be able to operate at the heightened temperatures expected to be found in the thermal pool 560, which may routinely exceed 500° C. and may in some embodiments be nearly as hot as molten magma. For lower temperature thermal pools 560, conventional thermocouples may be employed in the temperature sensor 122. For embodiments with high temperatures, many metals melt, and sensors comprising complex circuits can no longer function. For these situations, simpler systems such as a platinum resistance thermometer may be employed as the temperature sensor 122. For extremely hot temperatures, a dual metal (two component) thermostat may be employed, simply making electrical contact to close a circuit once a predetermined calibrated temperature has been reached. Other temperature sensor options may be known to those skilled in the art.

The thermal mass may also comprise other sensors, including but not restricted to motion sensors, accelerometers, acoustic sensors, optical sensors, infrared sensors, fluorescence sensors, pressure sensors, and sensors for temperature gradients. The connections for the various sensors can be through electrical wires to the communications cable 142, through a fiber optic connector, or through wireless transceivers. The only major consideration limiting selection among these various options is their ability to function under the temperature conditions found when the thermal mass 100 has been immersed in the thermal pool 560.

Once the thermal mass 100 has been heated in the thermal pool 560 and returned to the Heat Transfer Zone, the moving or telescoping junction 152 can be joined at the thermal fluid connector 135 to the internal transfer tube 115 within the thermal mass 100. The internal transfer tube 115 provides a means of evacuating the thermal fluid 55 from the thermal mass 100 through the thermal transfer conduit 150, which can also comprise a pumping system 155 to pump the thermal fluid 55 from the thermal mass 100 into the thermal reservoir 200. This pumping system 155 and conduit 150 can be the same pumping system and conduit previously used to fill the thermal mass, or in some embodiments separate pumping systems and conduits may be designed to provide an alternative flow channel. A valve 175 controls the flow of thermal fluid into the thermal reservoir through valve 185, which can be closed once the transfer has been completed. In some embodiments, the thermal transfer conduit 150 and components of the pumping system 155 as well as other components in contact with the thermal fluid may be coated with a suitable material such as Nichrome to prevent corrosion.

Once transferred to the thermal reservoir 200, the hot thermal fluid 55-H in the thermal reservoir 200 can then be used to generate electricity or drive another industrial process such as pyrolysis in a production facility 250, which can comprise a means for generating electricity 257 or some other production equipment. Once its heat has been extracted and used, the cooled thermal fluid 55-C can be returned to a cool thermal fluid reservoir 202, where it serves as a source of thermal fluid 55 for refilling the thermal mass 100.

Figure 8:
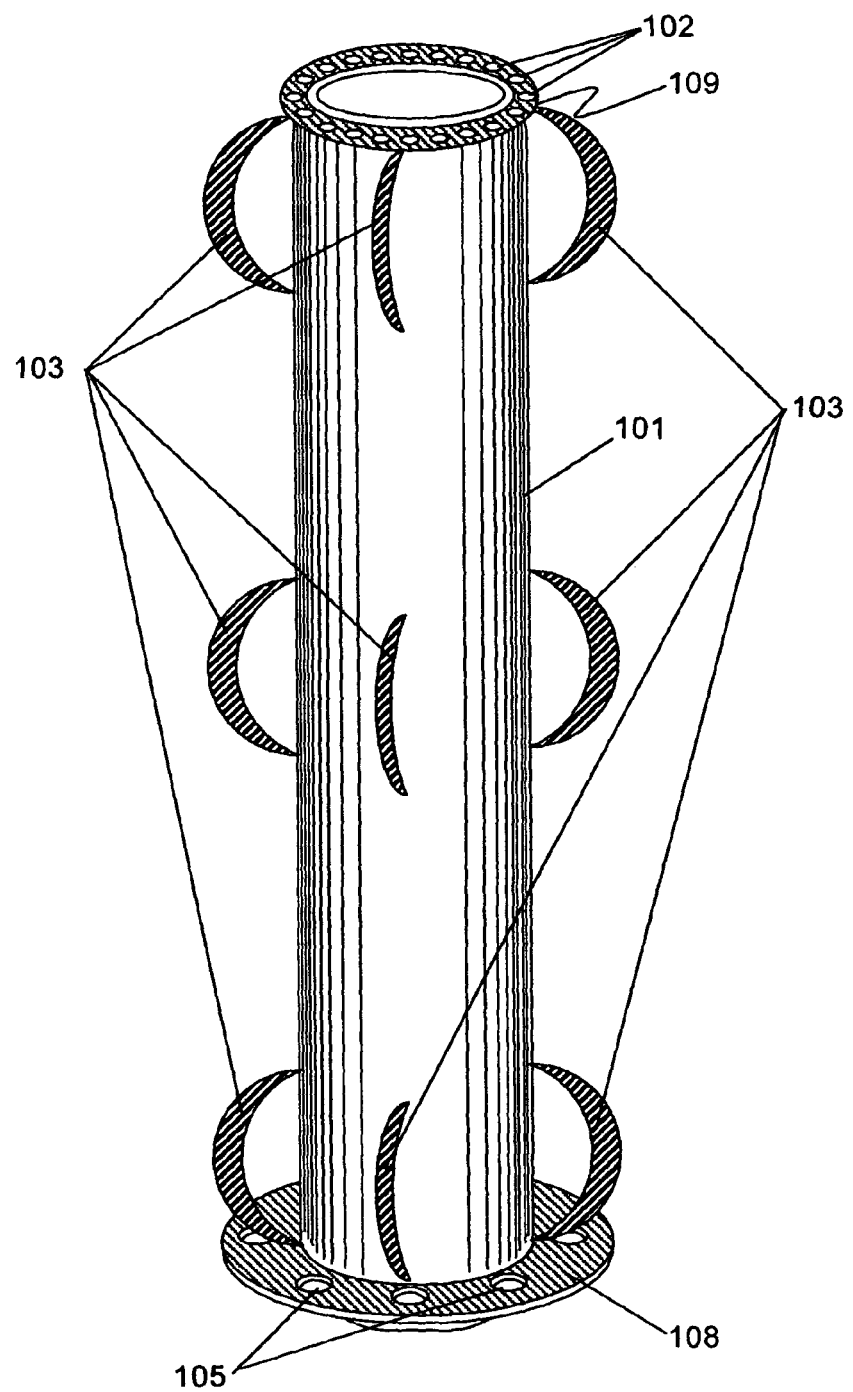
FIG. 8 presents an external shell for a thermal mass according to the invention.

FIG. 8 shows an example of one embodiment for the external parts of an assembly for a thermal mass 100. The exterior shell 101 in this example is a cylindrical tube, sealed at the bottom, and can be manufactured from a chromium alloy steel such as duplex SAE grade 2205 stainless steel if the thermal mass is to be used at temperatures lower than 300° C., while a corrosion resistant steel also containing molybdenum such as SAE grade 254SMO can be used for hotter temperatures. The thickness may vary depending on the overall weight and design considerations, but it is expected that a thickness of 1 cm (⅜") or larger for the wall thickness will be typical. The thermal mass 100 is also expected to typically be as large as 1 meter in diameter, and may be as long as 30 meters. The inner and/or outer surface of the exterior shell 101 can also be coated with an alloy such as nichrome to help prevent corrosion.

To facilitate centering in the well shaft 60, the outside of the cylindrical shell may be provided with several spacers 103 designed to be able to bump against the side of the well as the thermal mass 100 descends and ascends. The spacers 103 can be simple metallic structures acting as springs welded onto the side of the exterior shell 101, or can be more complex structures, comprising rollers or other mechanisms designed to reduce the friction with the wall of the well shaft 60.

The bottom of the exterior shell 101 can comprise structures 108 such as a ring or a flange that provide a means for supporting the bottom of the thermal mass 100 such as apertures 105 for attaching cables. These structures 108 may be welded to the exterior shell 101, held by means of a threaded grooves cut into the side of the exterior shell 101, or attached by some other means known to those skilled in the art. The top of the exterior shell 101 may comprise a shell flange 109 comprising a number of apertures 102 that can be used to seal the top of the thermal mass 100 using a sealing method such as a stainless steel O-ring, in which the shell flange 109 is bolted to a mating top flange through the apertures 102 in a manner that crushes the O-ring, making a seal. The only requirement is that this sealing method be able to withstand the temperatures and pressures that the thermal mass 100 will be subjected to in the thermal pool 560.

Figure 9:
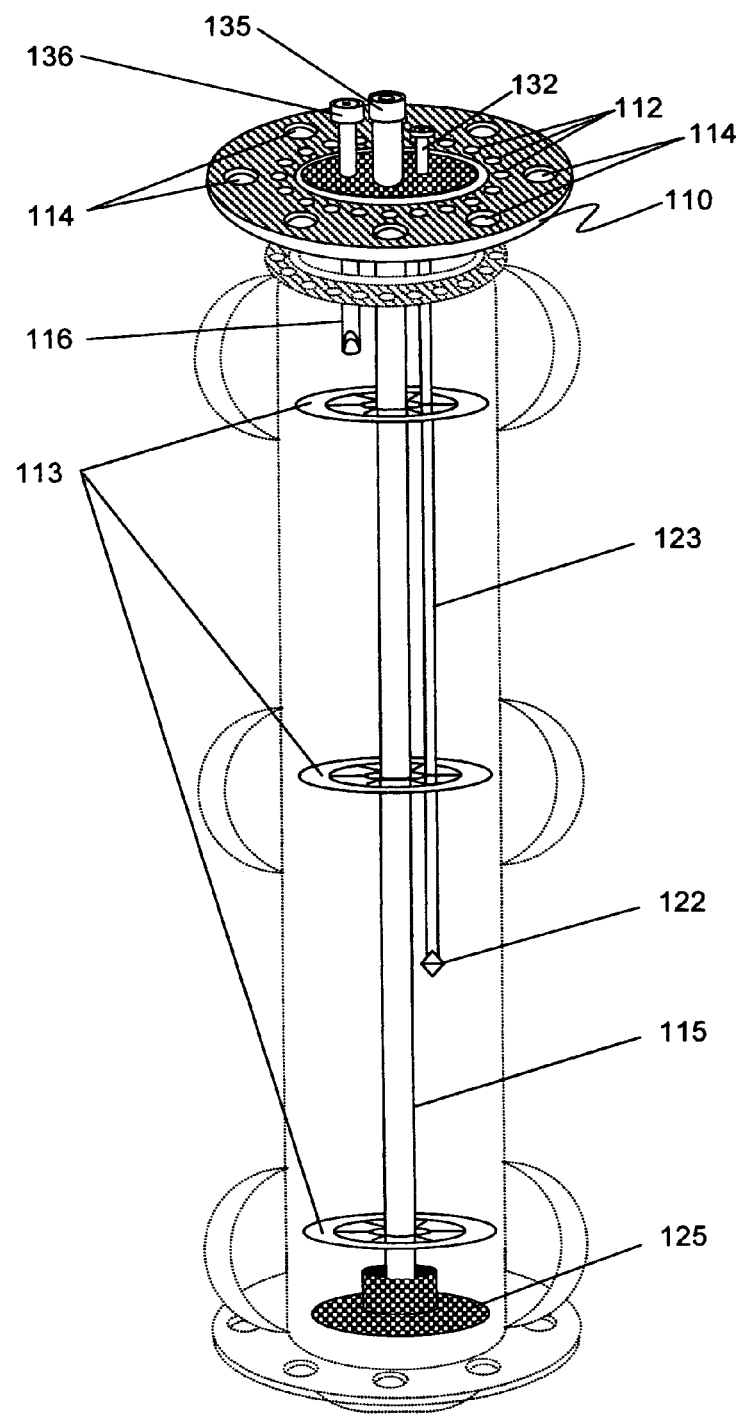
FIG. 9 presents the internal and top parts of a thermal mass according to a first embodiment of the invention.

FIG. 9 shows the complementary part of the thermal mass 100, comprising the top flange 110 and also several internal structures. The top flange 110 is designed to be mated to the shell flange 109 shown in FIG. 8, with apertures 112 in the top flange 110 aligned with the apertures 102 in the shell flange 109.

As shown in FIG. 9, the top flange 110 is larger in diameter than shell flange 109, and additionally comprises apertures 114 that provide a means of suspending the top of the thermal mass 100 from the suspension cable 140.

As shown in FIG. 9, the top flange 110 also comprises the various feedthroughs that connect the thermal mass 100 to various systems. The thermal fluid connector 135 is attached to the internal transfer tube 115 and is designed to mate with the moving or telescoping junction 152 to transfer the thermal fluid 55 into and out of the thermal mass 100. The cover gas connector 136 is attached to an internal cover gas tube 116 and is designed to mate with the piping 164 that provides cover gas 56 from the cover gas manager 160. The data connector 132 is attached to an internal data cable 123 that connects to internal sensors, such as a temperature sensor 122, and is designed to mate with the communication cable 142 that provides information about the thermal mass 100 to the control system 148.

As shown in FIG. 9, the internal structures can also comprise internal spacers 113 that hold the various internal elements such as the internal transfer tube 115 for thermal fluid and the internal data cable 123 in place. The internal structures can also comprise a shoe 125 at the bottom of the internal transfer tube 115 that adjusts the flow direction of the thermal fluid 55 as it enters and exits the thermal mass 100.

Figure 10:
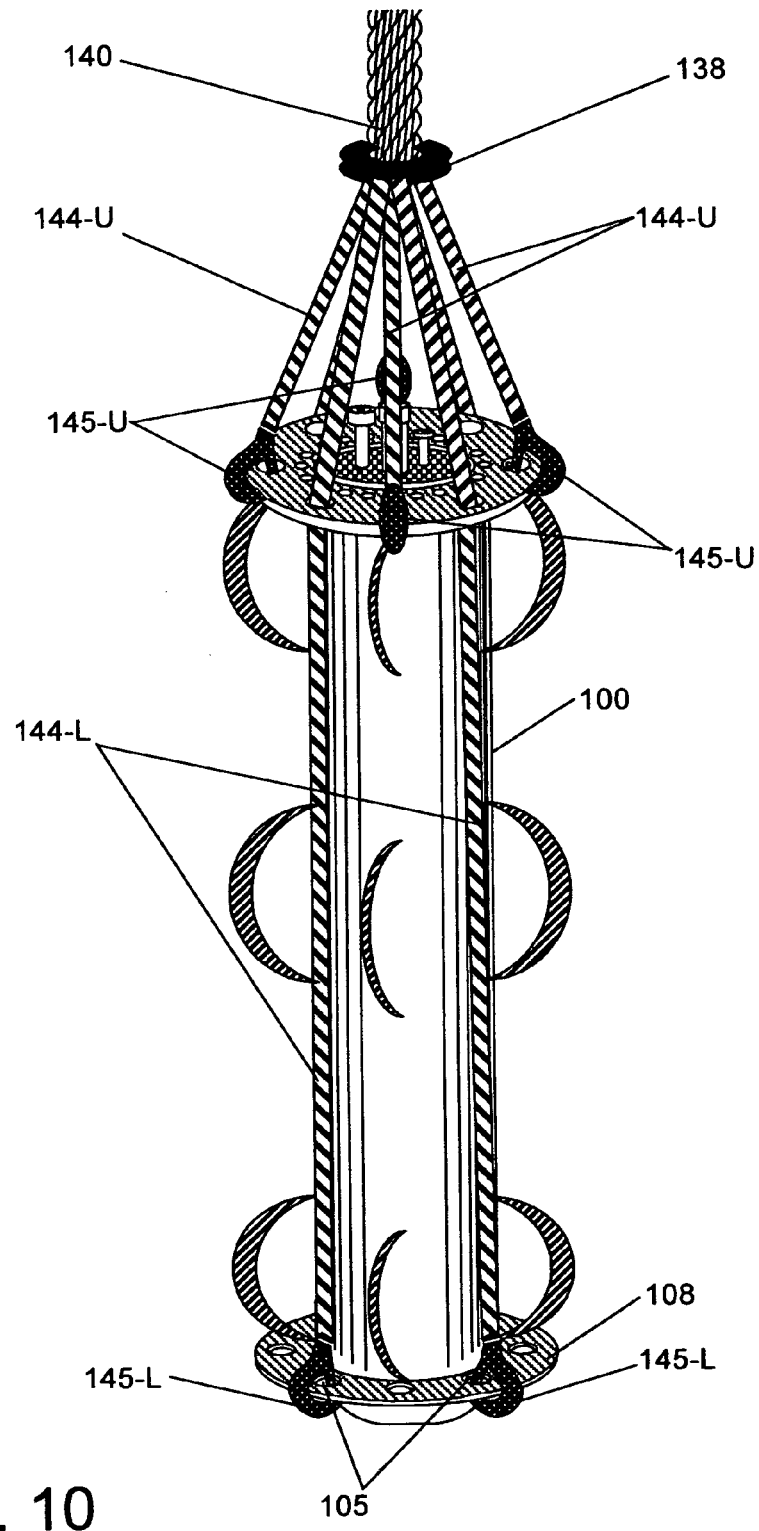
FIG. 10 presents a mechanism for mechanical support of the thermal mass according to the invention.

FIG. 10 shows one embodiment of the invention in which the assembled thermal mass 100 has been suspended from the suspension cable 140. In this illustration, the suspension cable 140 is split at the coupling mechanism 138 into eight smaller suspension cables 144, each with attachment mechanisms 145 such as hooks or fasteners. In the embodiment of FIG. 10, four of these cables 144-U are shorter, and attach to four of the apertures 114 in the top flange 110 using hooks 145-U. The other four cables 144-L are longer, and pass through the other apertures 114 in the top flange 110 and extend to the apertures 105 in the structures 108 attached to the lower portion of the thermal mass exterior shell 101 using hooks 145-L.

Although FIG. 10 presents one embodiment for suspending the thermal mass 100, it will be clear to those skilled in the art that several different suspension mechanisms can be devised which will still conform with the embodiments of the invention as described in this section. In one embodiment, a web of cables can support the thermal mass at a plurality of points. In one embodiment, the thermal mass can be contained in a net of cables that is suspended from the suspension cable 140. In one embodiment, the spacers 103 can be integrated into the suspension system to provide additional points of attachment for the smaller suspension cables 144 that merge to form the suspension cable 140. In other embodiments, the thermal mass itself may comprise steel rods or attachment mechanisms designed to mate with one or more attachment mechanisms, such as hooks, suspended from the suspension cable 140.

If will also be clear to those skilled in the art that the illustration in FIG. 10 is not necessarily to scale. The thermal mass can, for example, have a diameter as small as 1 cm or as large as 1 meter, as well as a length as small as 25 centimeters or as large as 30 meters or even larger, depending on the size and scale of the well and the lifting mechanism. It will also be clear to those skilled in the art that some embodiments of the invention may be engineered in which the thermal mass is more aerodynamically streamlined than illustrated in FIG. 10. A more streamlined design will reduce air drag on the thermal mass 100 as it is lowered into or hauled out of the well shaft 60, accelerating the energy transfer process.

It should also be noted that, although we have described this embodiment as using a cable as the mean of suspension, it will be known to those skilled in the art that ropes, chains, cords, wires, fabrics, fibers, nets, and other means of suspension can be used to support the thermal masses.

A Second Embodiment of the Invention

Figure 11:
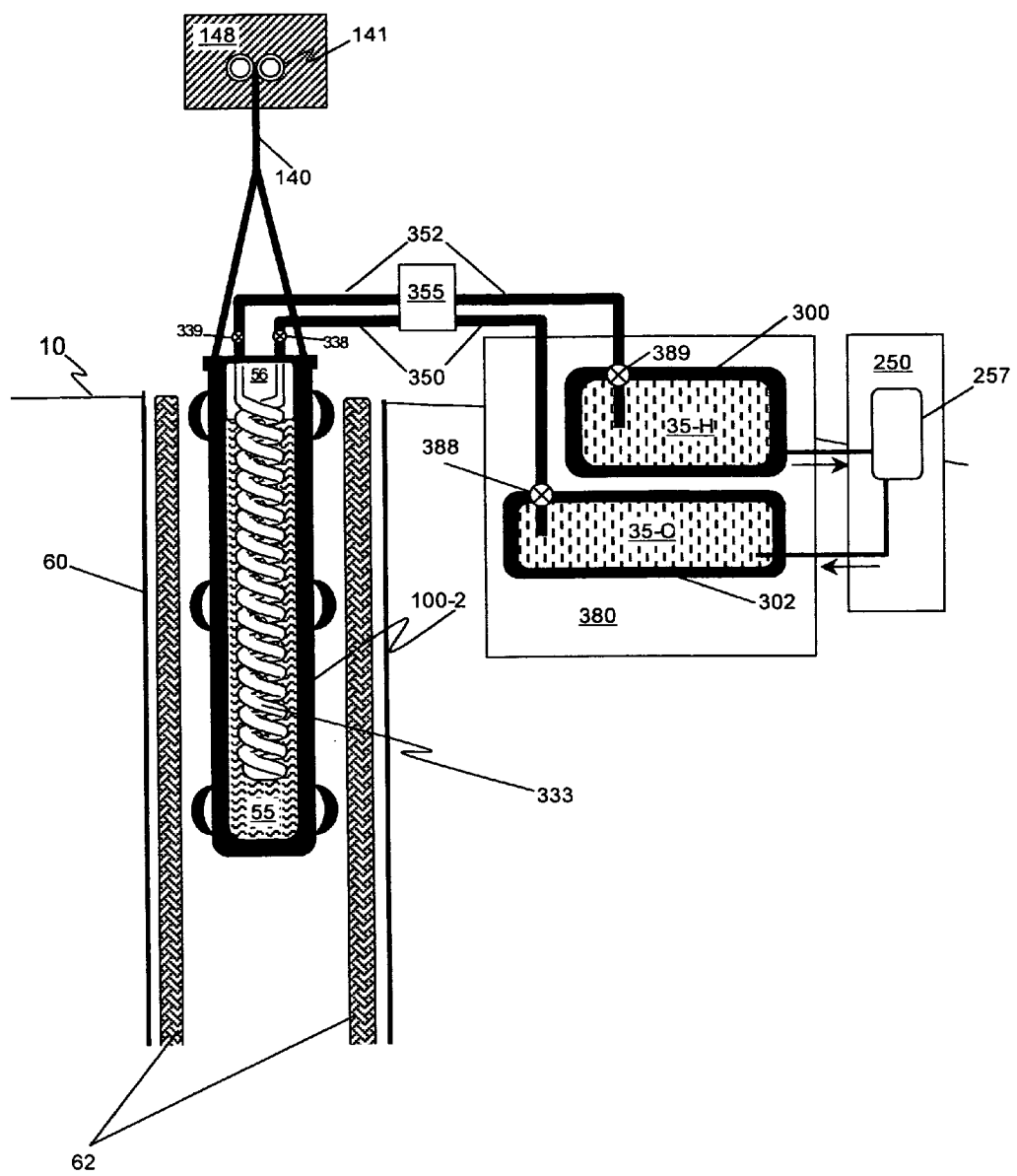
FIG. 11 presents a cross section view of an embodiment of the invention that uses a thermal exchange fluid to transfer the heat from the thermal mass.
Figure 12:
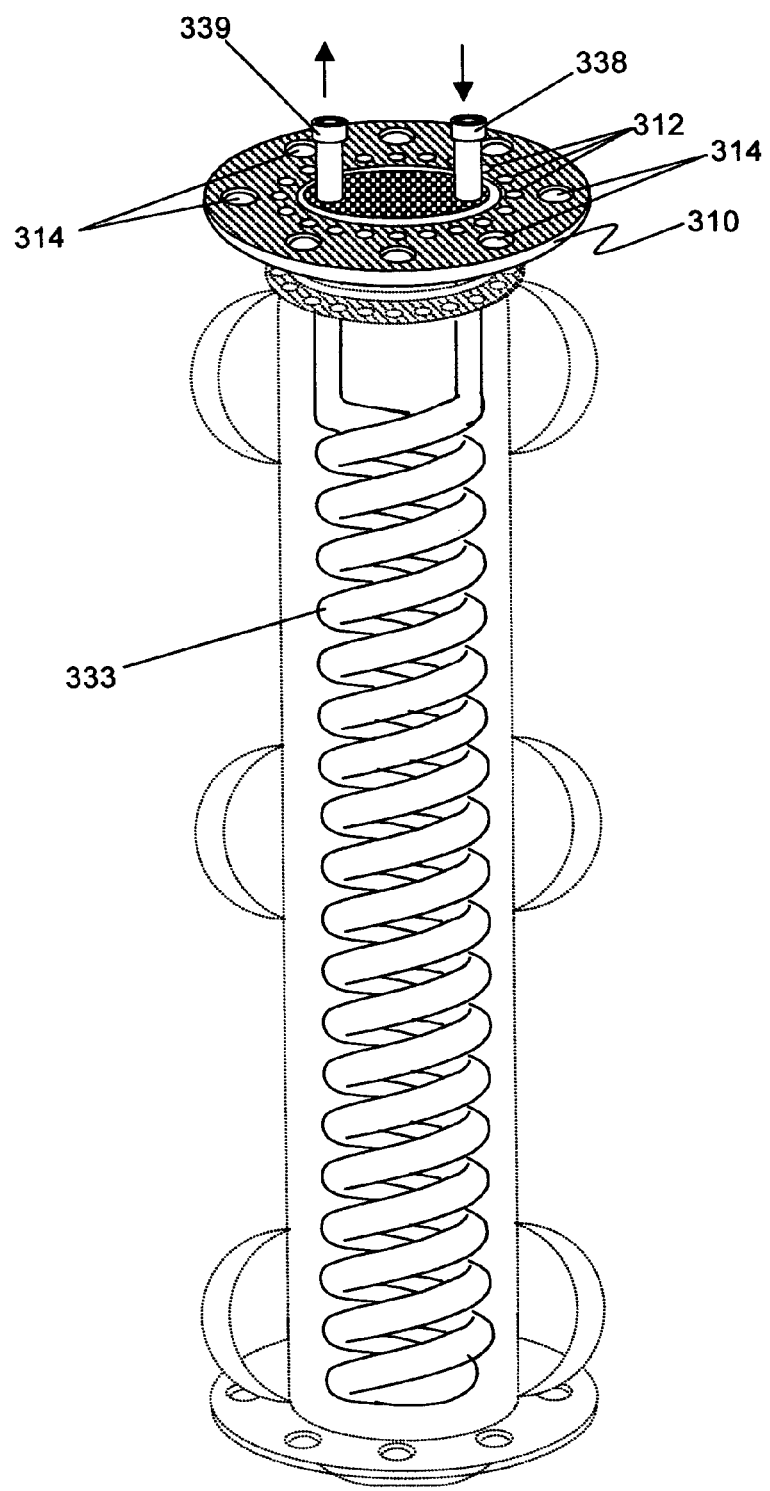
FIG. 12 presents the internal and top parts of a thermal mass according to a second embodiment of the invention.
Figure 13:
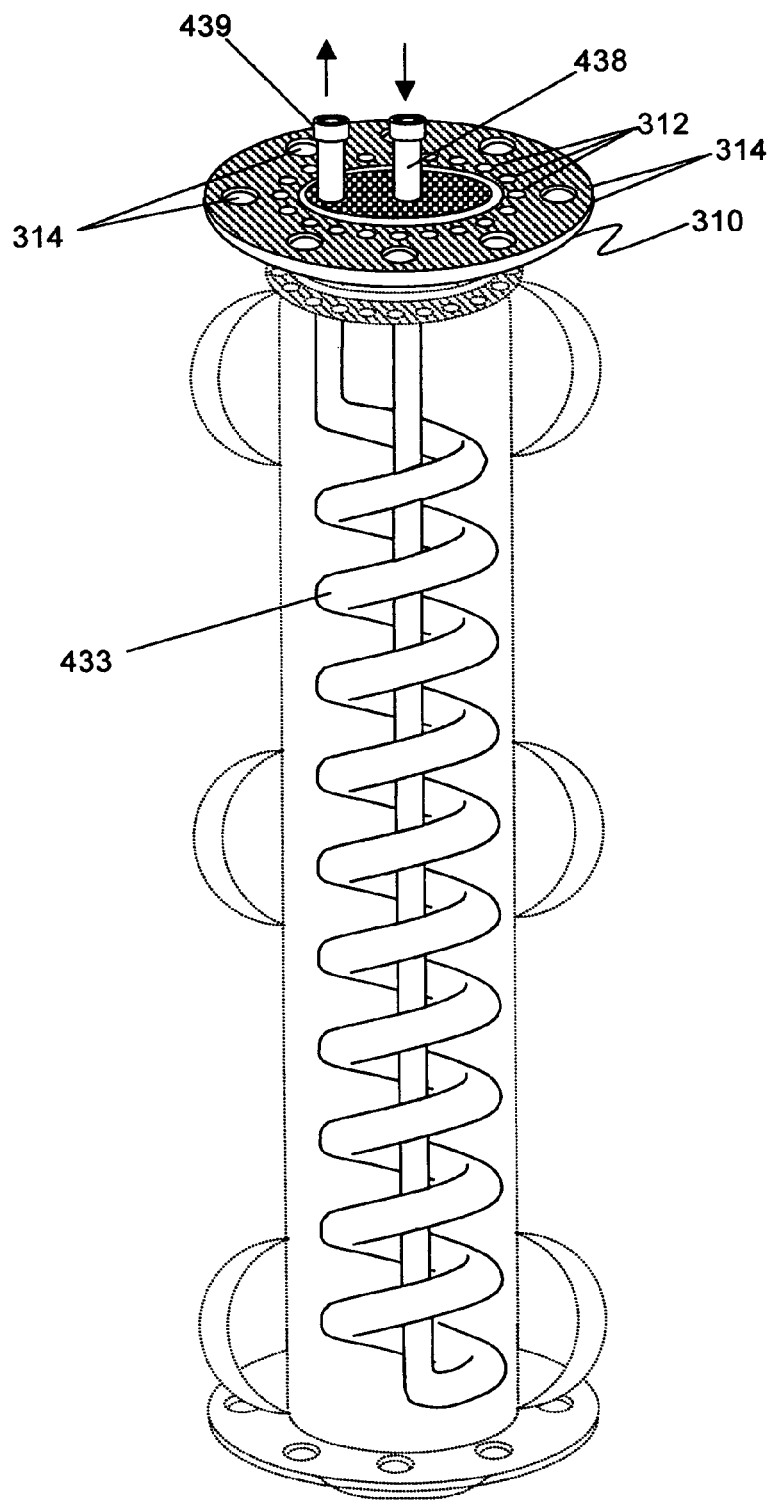
FIG. 13 presents the internal and top parts of a thermal mass according to a variation of the second embodiment of the invention.

FIG. 11, FIG. 12 and FIG. 13 show an alternative embodiment of the invention. In this embodiment, as in the first embodiment, a well shaft 60 can be dug to a thermal pool 560. As before, the well shaft 60 can be lined with various casings, such as an insulating casing 62 in the upper portions of the shaft and a thermal casing 64 in the lower portion of the shaft. As before, a thermal mass 100-2 is lowered on a suspension cable 140 to a Heat Absorption Zone, heated by the thermal pool 560. After heating, the thermal mass 100-2 is then raised to a Heat transfer Zone near the surface of the Earth 10, and the heat unloaded into a thermal reservoir 300 contained in a thermal reservoir containment 380. The thermal mass 100-2 again comprises a cylindrical exterior shell 101, which can be the same design as was illustrated for the previous embodiment in FIG. 8, and can also have an interior cavity containing a thermal fluid 55 covered with a cover gas 56.

However, in this embodiment, the thermal fluid 55 remains in the thermal mass 100-2, and the thermal mass 100-2 is designed with an internal channel comprising internal piping 333 designed to have a significant surface area in contact with the thermal fluid 55. The internal piping 333 facilitates the flow of a thermal transfer fluid 35 from a thermal reservoir containment 380 containing a thermal reservoir 300. The thermal transfer fluid absorbs heat as it flows through the internal piping 333 of the thermal mass 100-2. The thermal transfer fluid 35 can be a liquid, such as water, or one of many glycol-based fluids such as DOWTHERM™ (from Dow Chemical Company of Midland, Mich.), or be selected from a variety of proprietary fluids such as Duratherm S (offered for sale by Duratherm Extended Life Fluids of Lewiston, N.Y.) or Dynalene HT (offered for sale by Dynalene Inc. of Whitehall, Pa.); or be a molten salt mixture such as CN—K (Potassium Calcium Nitrate—$KNO_3$ $5Ca(NO_3)_2$ $10H_2O$) (offered for sale by Yara International ASA of Norway), or conventional molten salts comprising various mixtures of nitrates and nitrides used in the concentrated solar power (CSP) industry. The exchange fluid can also be a gas, such as nitrogen, argon, helium, or compressed carbon dioxide.

After the thermal mass 100-2 has been warmed in the thermal pool 560 and brought back to the surface, the internal piping 333 can be attached using intake junction 338 to the thermal transfer fluid input conduit 350 and outflow junction 339 to the outflow conduit 352. A pumping system 355 facilitates the transfer of the thermal transfer fluid 35 through the thermal mass 100-2 to the thermal reservoir 300 through export valve 389. The heated thermal transfer fluid 35-H in the thermal reservoir 300 can then be used to generate electricity or drive another industrial process such as pyrolysis in a production facility 250, which can comprise a means for generating electricity 257 or some other production equipment. Once its heat has been extracted and used, the cooled thermal transfer fluid 35-C can be returned to a cool thermal fluid reservoir 302, where it serves as a source of thermal fluid 35 for refilling the thermal mass 100-2.

FIG. 12 shows an example of one embodiment for the internal parts of an assembly for a thermal mass 100-2 designed to use a thermal transfer fluid 35. As in the previously described embodiment, a top flange 310 has been designed to mate with shell flange 109, and apertures 312 in top flange 310 are designed to correspond to the apertures 102 in shell flange 109 for sealing using a sealing method such as a stainless steel O-ring, as described in a previous embodiment.

However, in this embodiment, the top of the thermal mass 100-2 will comprise an intake junction 338 where thermal transfer fluid 35 enters the internal piping 333 of the thermal mass 100-2. The thermal transfer fluid heats up as it flows through the internal piping 333, which in this illustration is shown as a double helix structure. Heated thermal transfer fluid 35 then flows out of an outflow junction 339 where the thermal transfer fluid exits the internal piping 333 of thermal mass 100-2.

FIG. 13 shows an additional example of one embodiment for the internal parts of an assembly for a thermal mass 100-2 designed to use a thermal transfer fluid. As in the embodiment illustrated in FIG. 12, the thermal mass 100-2 comprises internal piping 433 to facilitate heat transfer, and comprises a top flange 310 that has been designed to mate with shell flange 109, and apertures 312 in the top flange 310 are designed to correspond to the apertures 102 in shell flange 109 for sealing using a sealing method such as a stainless steel O-ring, as described in a previous embodiment.

As in the embodiment of FIG. 12, thermal exchange fluid will be provided to the thermal mass 100-2 through an intake junction 438 where thermal transfer fluid enters the internal piping 433 of the thermal mass 100-2. The thermal transfer fluid heats up as it flows through the internal piping 433, but in this case the piping comprises a straight inflow pipe directly to the bottom of the thermal mass 100-2, and a helical return path to the top. The heated thermal transfer fluid 35 flows out through an outflow junction 439 where the thermal transfer fluid exits the internal piping 433 of thermal mass 100-2

Note that, although a temperature sensor can be used in this embodiment to monitor the thermal mass, it is not expected that a temperature sensor inside the thermal mass is necessary for these embodiments of the invention. Instead, the temperature of the thermal exchange fluid 35 can be monitored as the heat is transferred.

It should also be noted that one possible variation on this embodiment has no thermal fluid 55 filling the thermal mass. Instead, the thermal mass 100-3 is simply filled with a solid material having a large heat capacity, such as granite, iron or stainless steel surrounding the internal piping 333. The solid material can be a cast solid, such as cast iron, or an ensemble of solid objects such as granite sand or small ball bearings.

It should also be clear that, although internal channels comprising piping in the form of a helix or a double helix have been illustrated, other configurations are also possible. Channels normally used in heat exchangers, such as a serpentine form in which the piping forms a zigzag pattern, or a conventional spiral coil can also be used. Likewise, it should also be noted that the connections to the internal channel, although shown as separate connectors in FIG. 12 and FIG. 13, could be designed as a single connector that can accommodate both the insertion and the removal of the thermal exchange fluid.

A Third Embodiment of the Invention

In the previously described embodiments, the thermal mass can be lowered into the thermal well and then raised once it has acquired heat. However, for a single thermal mass raised into a single thermal well, significant energy must be expended to raise the thermal mass against the pull of gravity. This may place a practical limit on the mass that can be used, since a thermal mass that is heavier will require more energy to raise, especially when the wells are at depths of kilometers. However, heavier masses may be advantageous from a thermal energy point of view, in that heavier, denser thermal masses can have a significantly larger heat capacity, and therefore acquire more heat to be harvested once the thermal mass is returned to the surface.

An alternative embodiment of the invention can mitigate the energy expenditure required to raise warmed thermal masses from the thermal well. In this embodiment, at least two (2) paired thermal masses are connected by a single suspension cable, and serve as counter-weights for each other. Therefore, as one thermal mass is pulled down by gravity, it pulls its companion thermal mass up out of its thermal well.

Such counter-weight systems are commonly applied to the raising and lowering of construction materials for cranes, in the design of bridges, and the like. If the two thermal masses and cables are well matched, the only energy that need be lost to raise a thermal mass from a thermal wells is the energy to overcome the friction of the cables against their mechanisms, and the air resistance as the thermal masses are raised and lowered. Proper lubrication can reduce the energy losses due to friction, while aerodynamic design of the thermal masses can help reduce the drag encountered when the thermal mass is raised and lowered in the well shaft.

Figure 14:
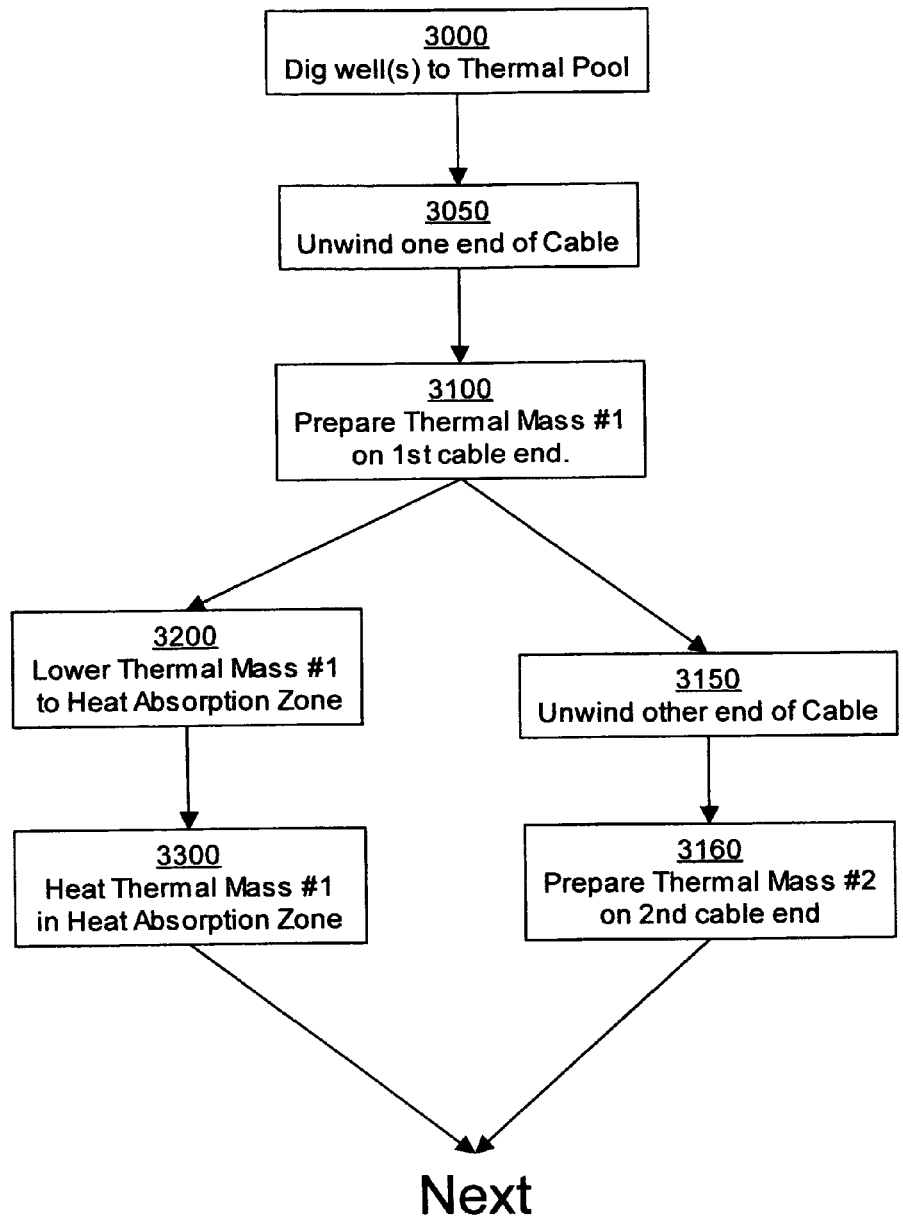
FIG. 14 presents a flow diagram of the first part of a process according to an embodiment of the invention in which two thermal masses are used.
Figure 15:
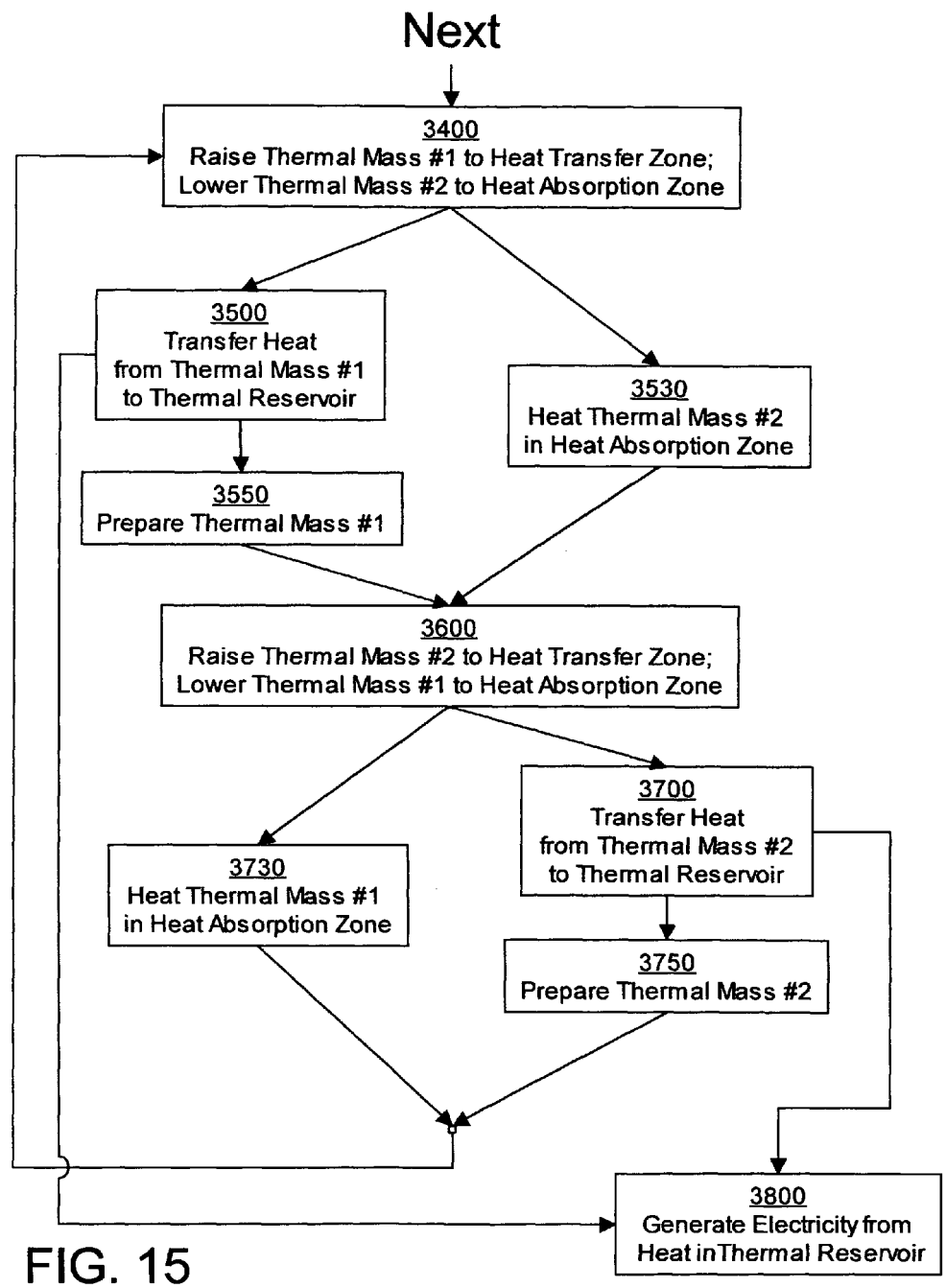
FIG. 15 presents a flow diagram of the second part of a process according to an embodiment of the invention in which two thermal masses are used.
Figure 16:
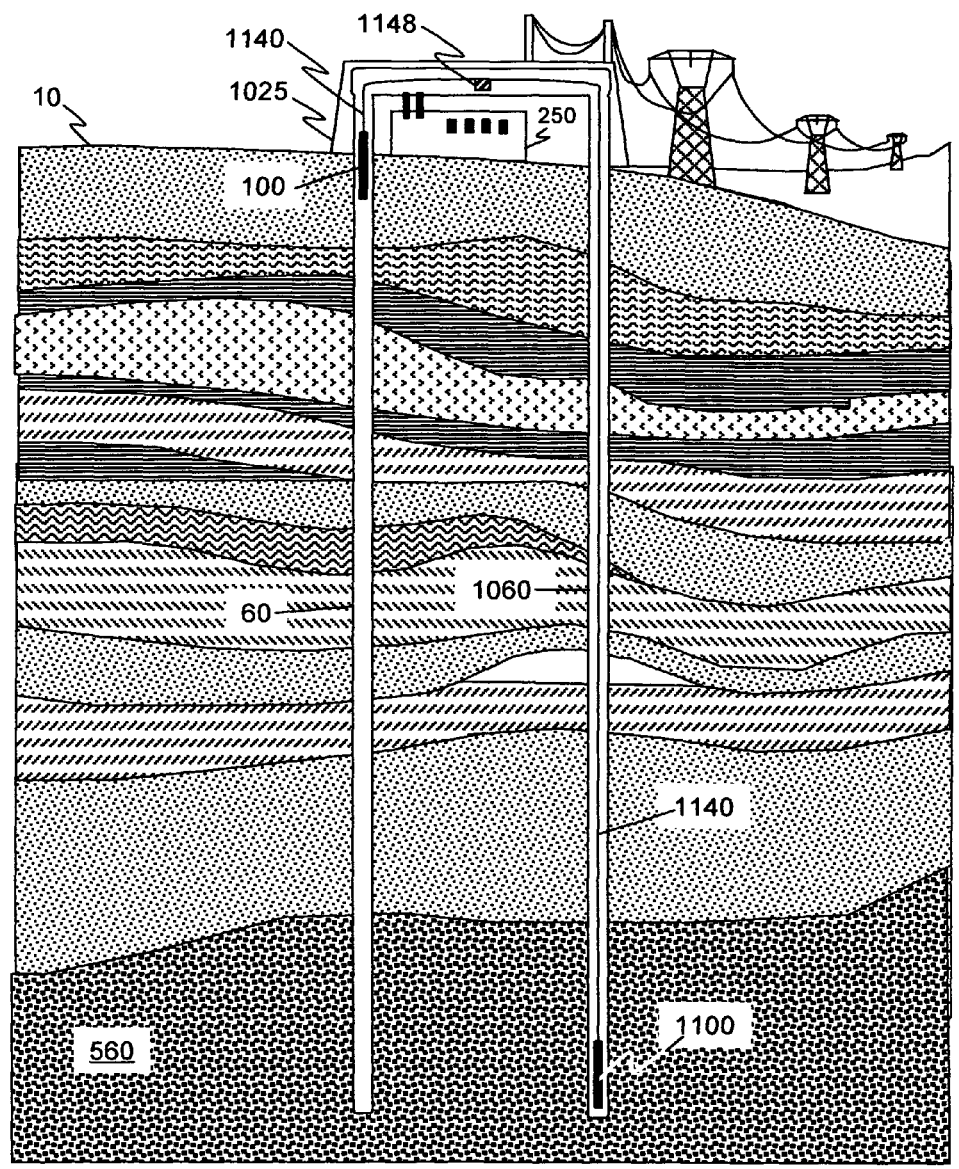
FIG. 16 presents a schematic overview of an embodiment of the invention in which two thermal masses are used.

The steps for this embodiment of the invention are illustrated in the flow diagrams of FIG. 14 and FIG. 15 and the overview cross-section diagram shown in FIG. 16. Note that the illustrations shown here are not to scale. The wells are anticipated to be kilometers deep, while the thermal masses are expected to be, for example, 50 centimeters to 30 meters long and perhaps 10 centimeters to 1 meter in diameter.

To start, as shown in FIG. 13, the initial step 3000 comprises digging well shafts 60 and 1060 into the Earth, until a portion of each well shaft 60 and 1060 is surrounded by a thermal pool 560, forming respective first and second Heat Absorption Zones. In the next step 3050, one end of the suspension cable 1140 is unwound, and in the third step 3100, a thermal mass 100 is then prepared with a procedure that typically comprises attaching it to one end of the suspension cable 1140, which in turn is attached to a control system 1148 for raising and lowering the thermal mass 100.

Once the thermal mass 100 has been prepared, in the next step 3200 the thermal mass 100 is then lowered down the well shaft 60 until it reaches the first Heat Absorption Zone heated by the thermal pool 560. After that, the next step 3300 comprises allowing the thermal mass 100 to remain surrounded in the first Heat Absorption Zone until a desired temperature is reached or a predetermined amount of heat has been transferred to the thermal mass 100.

In the meantime, near the surface of the Earth 10, a parallel step 3150 comprising unwinding the other end of the suspension cable 1140 occurs, and the second thermal mass 1100 is then prepared with a procedure step 3160 that typically comprises attaching it to the suspension cable 1140 which in turn is attached to the control system 1148 for raising and lowering the second thermal mass 1100.

After this, the next step 3400 as shown in continuation flow chart of FIG. 15 comprises raising the heated thermal mass 100 to the first Heat Transfer Zone near the surface of the Earth 10 while simultaneously lowering the second thermal mass 1100 into the second Heat Absorption Zone of a second well shaft 1060. By having the two thermal masses counterbalancing each other, the energy supplied by gravity to lower the second thermal mass 1100 pulls the first thermal mass 100 up the first well shaft 60, and therefore the only energy that need be supplied to drive the process is the energy to overcome friction and aerodynamic resistance of the thermal masses 100 and 1100 in their respective well shafts 60 and 1060.

The next step 3530 comprises allowing the thermal mass 1100 to remain in the second Heat Absorption Zone heated by the thermal pool 560 until a desired temperature is reached or a predetermined amount of heat has been absorbed by the thermal mass 100. In the meantime, in the first Heat Transfer Zone near the surface of the Earth 10, an alternative step 3500 executed in parallel comprises extracting the heat energy from the thermal mass 100 and transferring it to a thermal reservoir 200-2. Once the heat has been transferred from the thermal mass 100, the thermal mass 100 can be prepared according to the next alternative step 3550 for re-insertion into the well shaft 60.

After this, the next step 3600 comprises raising the heated second thermal mass 1100 to the second Heat Transfer Zone near the surface of the Earth 10 while at the same time lowering the first thermal mass 100 to the first Heat Absorption Zone of its well shaft 60. By having the two thermal masses counterbalancing each other, the energy supplied by gravity to pull the first thermal mass 100 down pulls the second thermal mass 1100 up the second well shaft 1060, and therefore the only energy that need be supplied to drive the process is the energy to overcome friction and aerodynamic resistance of the thermal masses 1100 and 100 in their respective well shafts 1060 and 60.

The next step 3730 comprises allowing the first thermal mass 100 to remain in the first Heat Absorption Zone heated by the thermal pool 560 until a desired temperature is reached or a predetermined amount of heat has been transferred to the thermal mass 100. In the meantime, in the second Heat Transfer Zone near the surface of the Earth 10, a parallel step 3700 comprises extracting the heat energy from the second thermal mass 1100 and transferring it to a thermal reservoir 200-2. Once the heat has been transferred from the thermal mass 100, the second thermal mass 1100 can be prepared again according to the next alternative step 3750 for re-insertion into the well shaft 60. Then, in a repetition of the previous step 3400, the heated thermal mass 100 is raised to the first Heat Transfer Zone while the second thermal mass 1100 is simultaneously lowered into the second Heat Absorption Zone of the second well shaft 1060, and with the subsequent repetition of the following steps 3500 through 3750, the cycle continues.

In the meantime, according to an alternative step 3800, the heat energy so transferred into the thermal reservoir 200-2 can be used for a number of useful processes, such as generating electricity, driving another industrial process such as pyrolysis, or simply being stored for later use in a production facility 250. A housing 1025 or other structure to protect the well shafts 60 and 1060 from the elements can also be constructed, either independent of, or in connection with the production facility 250.

FIG. 16 shows an overview schematic of a counterbalance system according to the invention. As before, a well shaft 60 has been drilled from the surface of the Earth 10 into the Earth so that a portion of the well shaft 60 is surrounded by a thermal pool 560, creating a Heat Absorption Zone. As before, the well shaft 60 can be lined with various casings, such as an insulating casing 62 in the upper portions of the shaft and a thermal casing 64 in the lower portion of the shaft. As before, a thermal mass 100, such as one described in the previous embodiments, is raised and lowered into the well shaft 60 on a suspension cable 1140. Heat can be transferred by one of the mechanisms described in the previous embodiments, such as complete detachment of the thermal mass 100, the transfer of a heated thermal fluid 55, or through the use of a thermal exchange fluid 35.

However, in this case, the suspension cable 1140 is also attached to a second thermal mass 1100 which is raised and lowered into a second well shaft 1060 that also has a portion of the well shaft 1060 surrounded by the thermal pool 560. This well shaft 1060 can also be lined with various casings, such as an insulating casing 62 in the upper portions of the shaft and a thermal casing 64 in the lower portion of the shaft. Typically, this second thermal mass 1100 would be of a matched type and design to the thermal mass 100, although variations may be desirable if some properties of the second well shaft 1060 differ from those of the initial thermal well shaft 60. A control system 1148 is used to control the mutual raising and lowering of the thermal masses in their respective well shafts 60 and 1060.

As in the previous embodiments, the thermal energy brought up with the initial thermal mass 100 or the second thermal mass 1100 can be used to generate electricity or drive another industrial process such as pyrolysis in a production facility 250. A housing 1025 or other structure to protect the well shafts 60 and 1060 from the elements can also be constructed, either independent of, or in connection with the production facility 250.

Figure 17:
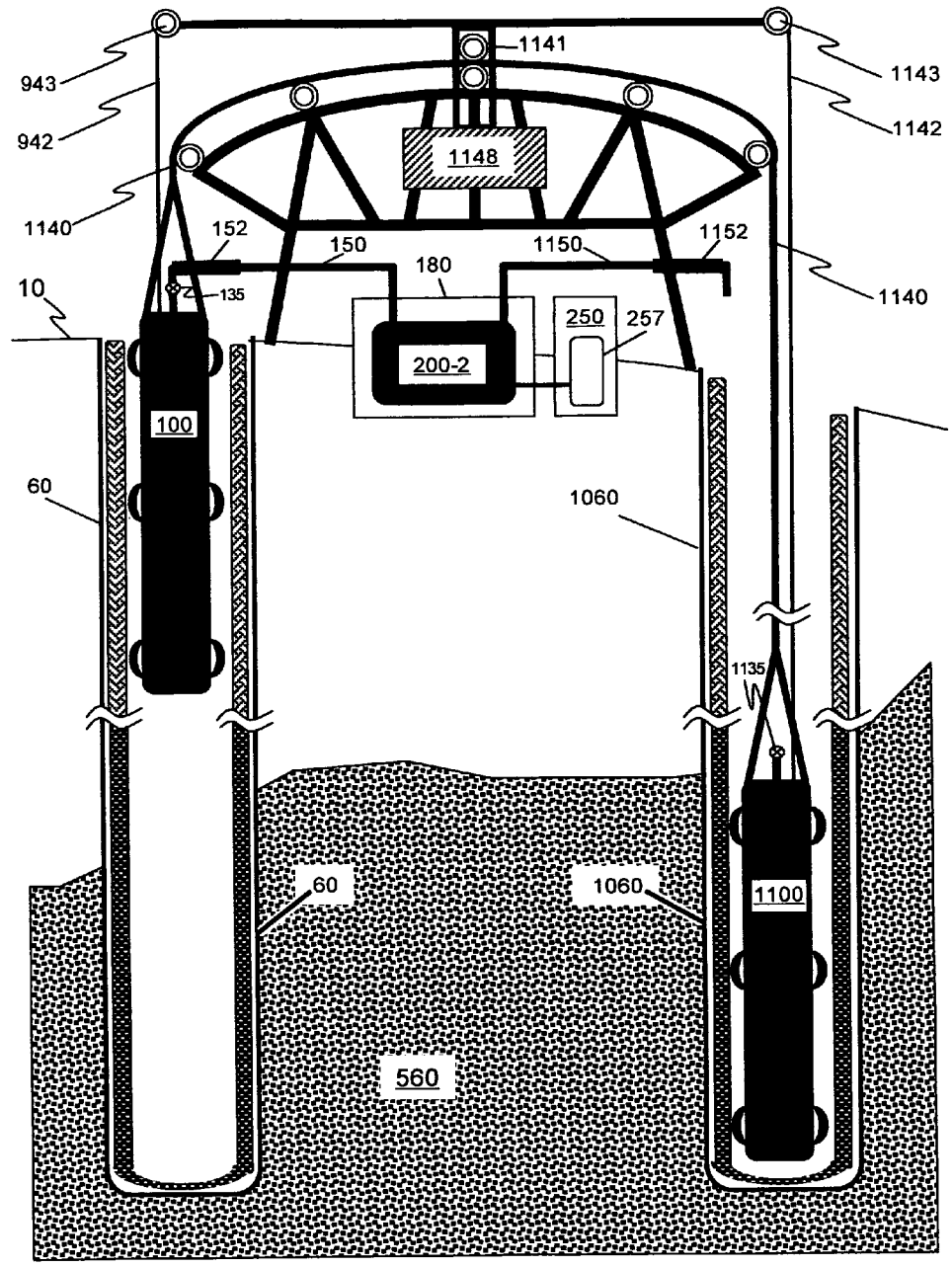
FIG. 17 presents in more detail a cross section view of the embodiment of the invention shown in FIG. 16 in which two thermal masses are used.

FIG. 17 shows a schematic of a counterbalance system according to the invention in more detail. Note that the illustration is not to scale, since the wells are anticipated to be kilometers deep while the thermal masses are expected to be 50 centimeters to 30 meters long.

In FIG. 17, as in the embodiment of FIG. 6, the thermal mass 100 has been raised to the surface and connected to the thermal reservoir 200-2 contained in a thermal reservoir containment 180 through the thermal transfer conduit 150 with a moving or telescoping junction 152 that connects using the thermal fluid connector 135. The suspension cable 1140 raises and lowers the thermal mass 100 and correspondingly lowers and raises the second thermal mass 1100, driven by a suspension mechanism 1141 that is controlled by a control system 1148.

As illustrated in FIG. 17, the second thermal mass will also require a means to unload its heat to the thermal reservoir 200-2, and in this illustration this is provided with a second thermal transfer conduit 1150 with a second telescoping junction 1152 that connects using the connector 1135 which is attached to the second thermal mass 1100 when it in turn has been raised near the surface of the Earth.

As in the previously described embodiments, it may be desired to have various sensors within the thermal masses. To facilitate the communication of data from these sensors on properties such as temperature, acceleration, distribution of mass, etc., a communication cable 942 driven by an independent mechanism 943 for the first thermal mass 100 and another communication cable 1142 driven by another independent mechanism 1143 for the second thermal mass 1100 may be used. These cables can be independently driven, or driven in concert by the control system 1148 that also controls the raising and lowering of the thermal masses 100 and 1100.

Figure 18:
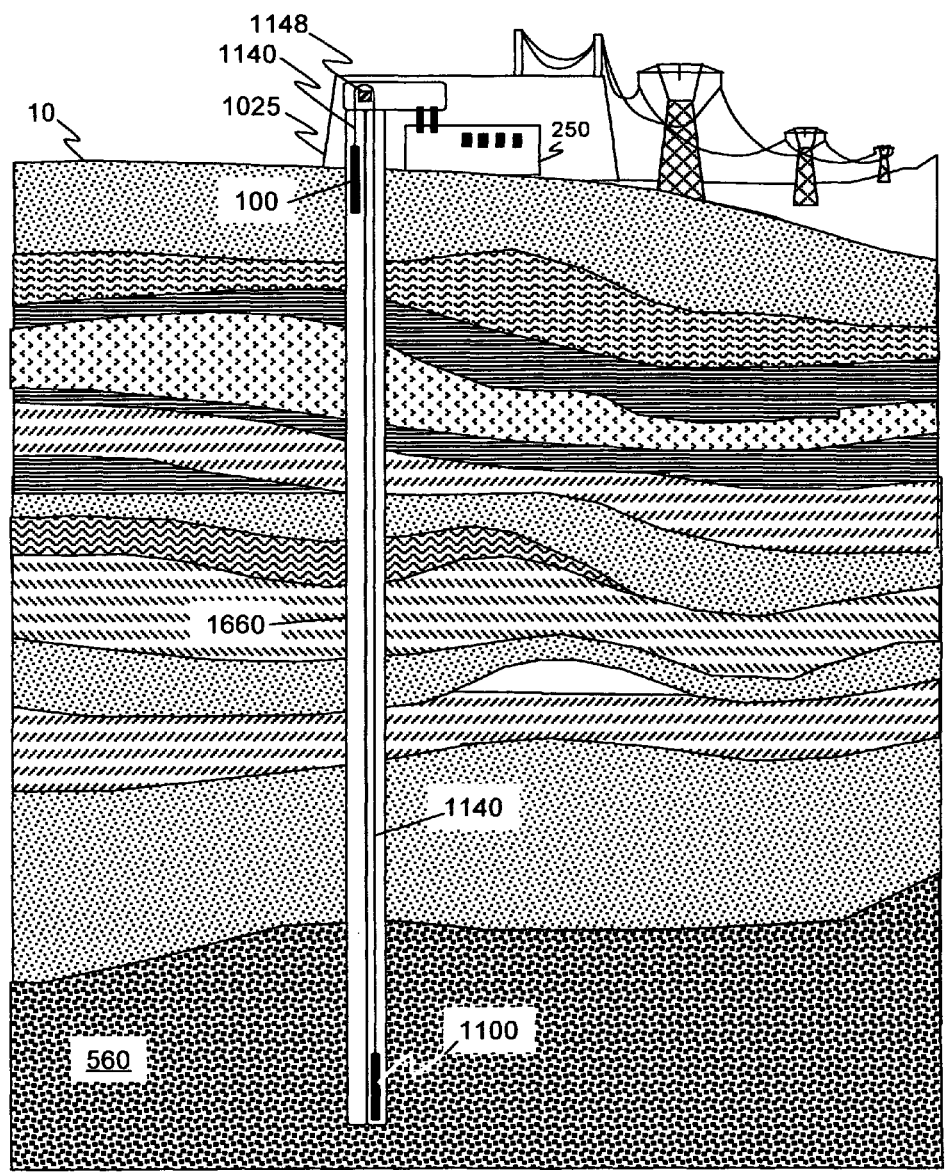
FIG. 18 presents a schematic overview of an embodiment of the invention in which two thermal masses are used in the same well.

FIG. 18 illustrates a variation of this embodiment of the invention, in which a counterbalance system comprising two thermal masses is used, but only one well shaft 2060 need be drilled. As in the previous embodiments, the well shaft 2060 can be lined with various casings, such as an insulating casing 62 in the upper portions of the shaft and a thermal casing 64 in the lower portion of the shaft. As before, there is an initial thermal mass 100 and a second thermal mass 1100, both attached to alternate ends of a suspension cable 1140. One thermal mass is raised from the thermal pool 560 while the other is lowered into the thermal pool 560, and the energy of gravity used to pull one weight down in turn is used to pull the other weight up. However, in this variation, a single well shaft 2060 has been dug, and the initial thermal mass 100 and the second thermal mass 1100 go up and down on different sides of a single well shaft 2060. This can reduce costs, as only one shaft need be prepared, but may add complexity to the structures within the shaft.

If should be noted that, although we have described this embodiment as using one cable as the means of suspension, it will be known to those skilled in the art that ropes, chains, cords, wires, fibers, fabrics, nets, and other means of mutual suspension can be used to support the two counterbalanced thermal masses.

Additional Variations of the Invention

Although certain detailed embodiments have been described in this disclosure and illustrated in these drawings, it will be clear that some of the elements of other technologies, such as EGS, can also be combined with the embodiments described here. For example, the material for thermal casing 64 for the portion of the thermal well immersed in the thermal pool can be constructed from a material such as the grout used in the SWEGS prior art system.

Likewise, in some embodiments of the invention, more complex physical structures can be created in the Heat Absorption Zone, such as a network of drilled passageways to facilitate thermal migration. Also, a fluid, such as a glycol based fluid or a molten salt, can also be placed in the bottom of the thermal well, so that the thermal mass is completely or partially immersed in a bath of hot liquid when in the Heat Absorption Zone. The detailed designs of these structures created in the Heat Absorption Zone will, however, vary depending on the details of the geological strata and local thermal properties in the thermal well.

Although the descriptions presented here typically describe the use of a single thermal mass on a given suspension cable, another embodiment of the invention can have multiple thermal masses on a suspension system or track. Also, although the well shafts in this disclosure have typically been illustrated as vertical shafts into the ground, alternative, angled well shafts could also be employed, especially if a track were to be inserted into the well shaft to allow a "train" of thermal masses to be inserted into a Heat Absorption Zone. Such a thermal "train" may at first seem awkward because of its additional weight, but if an embodiment of the invention using a pair of "trains" arranged using two shafts in a counterbalance arrangement were employed, the energy acquired by one "train" as it was pulled into the Earth by gravity would balance the energy needed to pull the second "train" out of its respective well shaft, with the only significant losses due to friction of the "train" with its track and the friction of the moving cables, and the drag caused by the rush of the wind flowing past the thermal "train".

A Molten Salt Closed Loop Embodiment of the Invention

In the previously described embodiments, a thermal fluid such as molten salt is placed in cavity within a thermal mass. The heat is acquired in a Heat Absorption Zone, and then transferred to a thermal reservoir in the Heat Transfer Zone.

Figure 19:
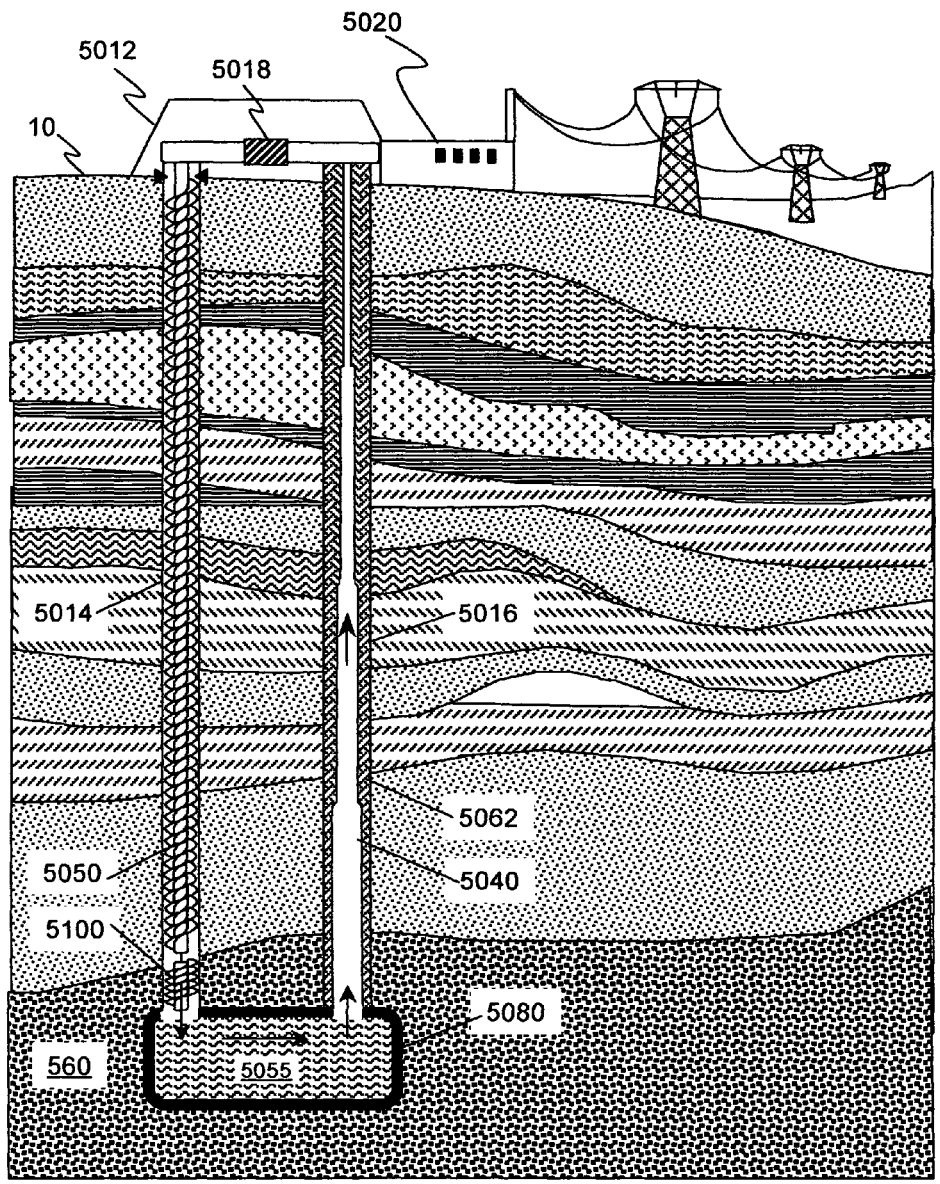
FIG. 19 presents a schematic overview of an embodiment of the invention using a closed loop for a thermal substance and comprising a screw along the length of the injection well.
Figure 20:
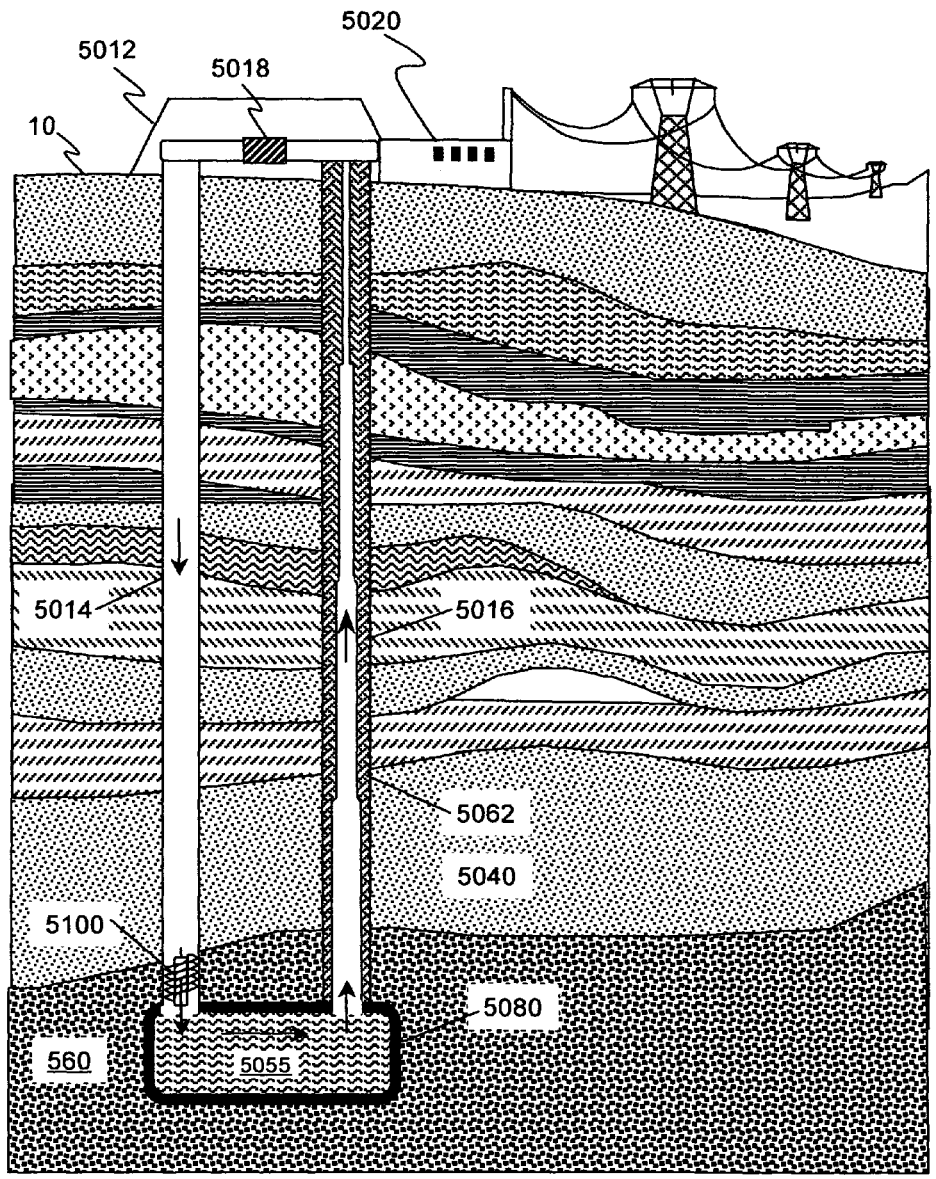
FIG. 20 presents a schematic overview of an embodiment of the invention using a closed loop for a thermal substance and comprising a ram screw in the Heat Absorption Zone.

Variations of another embodiment of the invention using a thermal material such as molten salt without bundling the thermal material in a thermal mass are illustrated in FIG. 19 and FIG. 20. In this embodiment, the thermal material does not need to be liquid at the beginning of the cycle, and can in some embodiments be a solid, such as ground or powdered solid salt at room temperature. In a facility 5012 built at or near the surface of the Earth 10, a circulating system 5018 directs this material into a first well shaft 5014, which can comprise a driving apparatus such as a screw 5050, as illustrated in FIG. 19, or a pneumatic conveyor system installed in all or part of the well shaft 5014, or, as illustrated in FIG. 20, can simply be empty.

This driving apparatus can fill the well shaft 5014, or be in several stages at various depths. In some embodiments of the invention may comprise an additional driver 5100 such as a ram screw that drives the thermal material into a chamber 5080 formed in the Heat Absorption Zone situated in the thermal pool 560.

As the thermal material progresses into the Earth to the Heat Absorption Zone, it heats up and, if it is a material such as a solid salt mixture, it will melt and become a liquid at higher temperatures. This melted material 5055 fills or partially fills the thermal chamber 5080, where it continues to absorb heat.

The pressure in the chamber 5080 created by the force on the thermal material provided by the additional driver 5100 pushes the hot material 5055 into the exit pipe 5040, where it proceeds to rise again through the exit pipe 5040 in a second well shaft 5016 to the surface of the Earth 10 and from there into the Heat Transfer Zone in a production facility 5020.

The exit pipe 5040 can surrounded by insulation 5062 for all or part of its length, and be designed as shown in the FIG. 19 and FIG. 20 with decreasing diameters for the cooler sections near the surface of the Earth 10. With the same inflow of material at the base of the exit pipe 5040, the thermal fluid in the sections of the exit pipe 5040 having a smaller diameter will have correspondingly higher velocity, and therefore have less time to cool as it rises to the Heat Transfer Zone.

Once in the Heat Transfer Zone, heat transfer from the thermal material proceeds as in the previously described embodiments. However, in this embodiment, the thermal materials can be cooled all the way down to room temperature, since the material does not need to be in liquid form for re-injection into the first well 5014. If the thermal material is, for example, molten salt, the additional temperature change from its melting point (142° C.) to room temperature (20° C.) can, using the numbers from Table I, represent an additional transfer of 190 kJ of heat per kilogram of material.

As disclosed in the previous embodiments, the well heads and surface circulating system 5018 can be enclosed in a facility 5012 which can be connected to or otherwise integrated with the production facility 5020.

With this application, several embodiments of the invention, including the best mode contemplated by the inventors, have been disclosed. It will be recognized that, while specific embodiments may be presented, elements discussed in detail only for some embodiments may also be applied to others.

It will also be recognized that, while generating electricity is a common end use for the heat produced by these embodiments in the Heat Transfer Zone, other industrial processes, such as electrolysis of water for the generation of hydrogen and oxygen; or such as pyrolysis of organic materials for the generation of "Syngas" or for waste processing; or the direct generation of mechanical energy using a steam turbine; or for the heating of objects for industrial smelting, baking, or curing processes, may all be driven by the geothermal heat harvested according to the invention. It will also be recognized that the thermal mass can comprise additional chambers and constructions designed to facilitate some or all of the steps of these industrial processes while the thermal mass is still present into the Heat Absorption Zone. Other processes and end uses for the geothermal heat that may be known to those skilled in the art.

While specific materials, designs, configurations and fabrication steps have been set forth to describe this invention and the preferred embodiments, such descriptions are not intended to be limiting. Modifications and changes may be apparent to those skilled in the art, and it is intended that this invention be limited only by the scope of the appended claims.

What is claimed is:

1. A method for transferring geothermal heat, comprising the steps of:
   preparing at least two thermal masses connected by a cable;
   lowering a first thermal mass among the at least two thermal masses to a first heat absorption zone;
   raising the first thermal mass to a first heat transfer zone while simultaneously lowering a second thermal mass among the at least two thermal masses to a second heat absorption zone;
   transferring heat out of the first thermal mass;
   raising the second thermal mass to a second heat transfer zone while simultaneously lowering the first thermal mass to the first heat absorption zone; and
   transferring heat out of the second thermal mass,
   wherein each of the first thermal mass and the second thermal mass further comprises internal piping configured to facilitate heat exchange between the first thermal mass or the second thermal mass and a thermal exchange fluid disposed in the internal piping.

2. The method of claim 1, in which the steps of transferring heat out of the first thermal mass or the second thermal mass comprises transferring the first thermal mass or the second thermal mass to a thermal reservoir.

3. The method of claim 2 in which the heat transferred to the thermal reservoir is used to generate electricity.

4. The method of claim 1, in which at least one of the at least two thermal masses comprises a chamber for containing a thermal fluid; and
the step of transferring heat out of the first thermal mass with a chamber or the second thermal mass with a chamber comprises transferring the thermal fluid contained in the first thermal mass or the second thermal mass out of the first thermal mass or the second thermal mass.

5. The method of claim 4, in which the step of transferring the heat out of the first thermal mass or second thermal mass additionally comprises transferring the thermal fluid into a thermal reservoir.

6. The method of claim 4, in which the thermal fluid comprises one or more of water, a molten salt selected from potassium calcium nitrate, sodium fluoride, and potassium nitrate.

7. The method of claim 1, wherein the internal piping of the first thermal mass is arranged in a coiled configuration.

8. The method of claim 7, wherein the coiled configuration comprises one or more of:
a double helix; and
a helical heat exchange portion and a linear return portion.

9. The method of claim 1, wherein the internal piping of each thermal mass is arranged in a coiled configuration.

10. The method of claim 9, wherein each coiled configuration comprises one or more of:
a double helix; and
a helical heat exchange portion and a linear return portion.

11. The method of claim 1, in which at least one of the at least two thermal masses comprises a heat exchanger; and
the step of transferring the heat out of the first thermal mass or the second thermal mass comprises passing a transfer fluid through the heat exchanger.

12. The method of claim 11, in which the transfer fluid passing through the heat exchanger of the thermal mass also passes through a second heat exchanger in the heat transfer zone.

13. The method of claim 11, in which the transfer fluid comprises water.

14. The method of claim 11, in which the transfer fluid comprises a glycol-based fluid.

15. The method of claim 11, in which the step of transferring the heat out of the first thermal mass or the second thermal mass with a heat exchanger additionally comprises storing the transfer fluid that has passed through the heat exchanger in a thermal reservoir.

16. The method of claim 15, in which the transfer fluid is transferred into the thermal mass from a cool reservoir.

17. The method of claim 11, in which the transfer fluid comprises a molten salt.

18. The method of claim 17, in which the molten salt comprises potassium calcium nitrate.

19. The method of claim 17, in which the molten salt comprises potassium nitrate.

20. The method of claim 17, in which the molten salt comprises Sodium fluoride.

21. The method of claim 1, in which the first heat absorption zone and the second heat absorption zone are both in approximately the same location; and
the first heat transfer zone and the second heat transfer zone are both in approximately the same location.

22. The method of claim 21, in which the first heat absorption zone and the second heat absorption zone are both at the bottom of a well shaft; and
the first heat transfer zone and the second heat transfer zone are both near the top of the well shaft.

23. A method for extracting geothermal energy from the Earth, comprising the steps of:
lowering a thermal mass comprising a quantity of salt into a geothermal heat absorption zone;
heating the quantity of salt;
raising the quantity of salt to a heat transfer zone;
transferring the quantity of salt into a thermal reservoir; and
monitoring one or more environmental conditions utilizing one or more sensors coupled to the thermal mass, the one or more sensors comprising:
at least one accelerometer;
at least one temperature sensor including one or more of a platinum resistance thermometer and a dual metal thermostat;
at least one acoustic sensor;
at least one of optical sensors, infrared sensors, and fluorescence sensors; and
at least one pressure sensor.

24. The method of claim 23, in which the step of lowering a quantity of salt comprises moving the quantity of salt with a screw mechanism.

25. The method of claim 23, in which the quantity of salt is initially in solid form, and in which heating the quantity of salt comprises melting the salt.

26. The method of claim 25, in which the solid form of the salt is a powder.

27. A method for generating electricity, comprising the steps of:
heating a thermal mass in a heat absorption zone;
raising the thermal mass to a heat transfer zone;
transferring the heat out of the thermal mass and into a thermal reservoir;
using the heat in the thermal reservoir to drive a turbine that generates electricity; and
wherein the thermal mass comprises a thermal exchange fluid, the thermal exchange fluid being selected from a group consisting of:
one or more molten salts selected from:
sodium nitrite;
sodium nitrate;
sodium chloride;
potassium fluoride; and
potassium chloride;
a glycol-based fluid;
one or more metals; and
one or more gases selected from
nitrogen;
argon;
helium; and
compressed carbon dioxide.

28. A method for generating electricity, comprising the steps of:
lowering a quantity of salt into a geothermal heat absorption zone;
heating the quantity of salt;
raising the quantity of salt to a heat transfer zone; and transferring the quantity of salt into a thermal reservoir
using the heat from the salt in the thermal reservoir to
drive a turbine that generates electricity.

\* \* \* \* \*